(12) United States Patent
Kernbaum et al.

(10) Patent No.: US 11,566,690 B2
(45) Date of Patent: Jan. 31, 2023

(54) VARIABLE TRANSMISSIONS WITH NESTED PULLEYS

(71) Applicant: SRI INTERNATIONAL, Menlo Park, CA (US)

(72) Inventors: Alexander Kernbaum, Sunnyvale, CA (US); Reuben Brewer, Menlo Park, CA (US); Murphy Kitchell, Menlo Park, CA (US); John Marlow, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 220 days.

(21) Appl. No.: 17/056,798

(22) PCT Filed: May 21, 2019

(86) PCT No.: PCT/US2019/033414
§ 371 (c)(1),
(2) Date: Nov. 19, 2020

(87) PCT Pub. No.: WO2019/226713
PCT Pub. Date: Nov. 28, 2019

(65) Prior Publication Data
US 2021/0207701 A1    Jul. 8, 2021

Related U.S. Application Data

(60) Provisional application No. 62/674,278, filed on May 21, 2018.

(51) Int. Cl.
*F16H 9/26* (2006.01)
*F16H 55/56* (2006.01)
*F16H 9/12* (2006.01)

(52) U.S. Cl.
CPC ............... *F16H 9/26* (2013.01); *F16H 9/125* (2013.01); *F16H 55/56* (2013.01)

(58) Field of Classification Search
CPC ........... F16H 55/56; F16H 63/067; F16H 9/16
(Continued)

(56) References Cited

U.S. PATENT DOCUMENTS 1,031,988 A * 7/1912 Draullette ............. F16H 55/566
474/201
2,158,047 A * 5/1939 Weston ..................... F16H 9/24
474/30
(Continued)

FOREIGN PATENT DOCUMENTS

GB         762 990        3/1955
WO       2017/132411      8/2017

OTHER PUBLICATIONS

The International Search Report (ISR) with Written Opinion for PCT/US2019/033414 dated Aug. 9, 2019, pp. 1-7.

*Primary Examiner* — Henry Y Liu
(74) *Attorney, Agent, or Firm* — McDonnell Boehnen Hulbert & Berghoff LLP

(57) ABSTRACT

A variety of transmission mechanisms are provided that include split pulleys nested within each other in order to reduce the size of the transmissions, to provide infinitely variable transmission ratios that include forward and reverse ratios, or to provide some other benefits. The transmissions include multiple inner split pulleys nested within an outer split pulley. Two, three, or more inner split pulleys can be disposed within the transmission to balance the mass of the inner split pulleys in order to reduce vibration and internal stresses experienced by the transmission. This can increase the lifespan of the transmission, reduce wear, and increase efficiency. Additionally, providing multiple inner split pul-
(Continued)

leys in a nested configuration can allow for reduction of loads transmitted through bearings of the transmission.

21 Claims, 11 Drawing Sheets

(58) Field of Classification Search
USPC .................................................. 474/8, 19, 30
See application file for complete search history.

(56) References Cited

U.S. PATENT DOCUMENTS

| | | | | |
|---|---|---|---|---|
| 2,431,494 | A * | 11/1947 | Morse | F16H 9/16 474/30 |
| 3,516,296 | A * | 6/1970 | Detwiler | F16H 63/067 474/23 |
| 3,726,158 | A * | 4/1973 | Brown | F16H 1/32 475/167 |
| 4,056,987 | A * | 11/1977 | Hoffmann | F16H 9/12 475/210 |
| 4,274,295 | A * | 6/1981 | Grube | F16H 55/56 474/43 |
| 4,453,701 | A * | 6/1984 | Huggett | B66D 1/7421 254/371 |
| 4,689,036 | A * | 8/1987 | Love | F16H 61/6625 474/19 |
| 4,869,705 | A * | 9/1989 | Fenton | F16H 63/067 474/8 |
| 4,909,776 | A * | 3/1990 | Sakakibara | F16H 63/062 474/11 |
| 5,013,283 | A * | 5/1991 | d'Herripon | F16H 9/125 474/8 |
| 5,050,457 | A * | 9/1991 | Takayama | F16H 63/062 474/70 |
| 6,383,102 | B1 * | 5/2002 | Onogi | F16H 61/66272 474/18 |
| 6,398,679 | B1 * | 6/2002 | Brown | F16H 55/56 474/30 |
| 6,398,680 | B1 * | 6/2002 | Onogi | F16H 61/66272 474/30 |
| 6,926,632 | B2 * | 8/2005 | Brown | F16H 9/16 474/8 |
| 7,048,658 | B2 * | 5/2006 | Butsch | F16H 25/2252 474/23 |
| 7,540,815 | B2 * | 6/2009 | Brown | F16H 9/18 474/43 |
| 8,894,520 | B2 * | 11/2014 | Labbe | F16H 63/067 474/19 |
| 10,851,887 | B2 * | 12/2020 | Hagihara | F16H 61/32 |
| 10,919,377 | B2 * | 2/2021 | Ranade | F16H 37/0806 |
| 2002/0019280 | A1 * | 2/2002 | Brown | F16H 9/16 474/8 |
| 2002/0183144 | A1 * | 12/2002 | Crewe | F16H 9/26 474/8 |
| 2003/0004022 | A1 * | 1/2003 | Brown | F16H 55/56 474/31 |
| 2004/0204283 | A1 * | 10/2004 | Inoue | F16H 61/6648 476/46 |
| 2007/0101820 | A1 * | 5/2007 | Bulatowicz | F16H 49/001 74/640 |
| 2007/0105671 | A1 * | 5/2007 | Binello | F16H 55/56 474/19 |
| 2008/0207363 | A1 * | 8/2008 | Maguire | B60K 17/16 474/272 |
| 2010/0272571 | A1 * | 10/2010 | Yonge | B62M 9/08 474/49 |
| 2011/0154928 | A1 * | 6/2011 | Ishikawa | F16H 55/0833 74/461 |
| 2013/0112806 | A1 * | 5/2013 | Walitzki | B64C 25/405 244/50 |
| 2014/0206488 | A1 * | 7/2014 | Yeh | F16H 1/32 475/162 |
| 2014/0256495 | A1 * | 9/2014 | Waide | F16H 49/001 475/167 |
| 2015/0024882 | A1 * | 1/2015 | Ochab | F16H 63/067 474/19 |
| 2015/0075310 | A1 * | 3/2015 | Lunin | F16H 49/001 74/412 R |
| 2015/0107387 | A1 * | 4/2015 | Kuo | F16H 49/001 74/412 R |
| 2015/0354686 | A1 * | 12/2015 | Balsiger | F16H 49/001 74/640 |
| 2016/0010701 | A1 * | 1/2016 | Balsiger | F16D 27/108 74/405 |
| 2016/0010738 | A1 * | 1/2016 | Balsiger | H02K 7/116 29/893.1 |
| 2016/0047452 | A1 * | 2/2016 | Jensen | F16H 49/001 74/640 |
| 2017/0276012 | A1 * | 9/2017 | Chandler | F01D 17/12 |
| 2018/0038467 | A1 * | 2/2018 | Balsiger | B64C 13/34 |
| 2018/0038468 | A1 * | 2/2018 | Balsiger | F16H 49/001 |
| 2018/0112760 | A1 * | 4/2018 | Balsiger | B64C 13/34 |
| 2018/0372205 | A1 * | 12/2018 | Preuss | F16H 49/001 |
| 2019/0203816 | A1 * | 7/2019 | Fu | B62D 11/12 |
| 2019/0264791 | A1 * | 8/2019 | Atmur | F16H 49/001 |
| 2020/0032900 | A1 * | 1/2020 | Tokoi | F16H 61/66272 |
| 2020/0040981 | A1 * | 2/2020 | Zhao | F16H 57/021 |

* cited by examiner

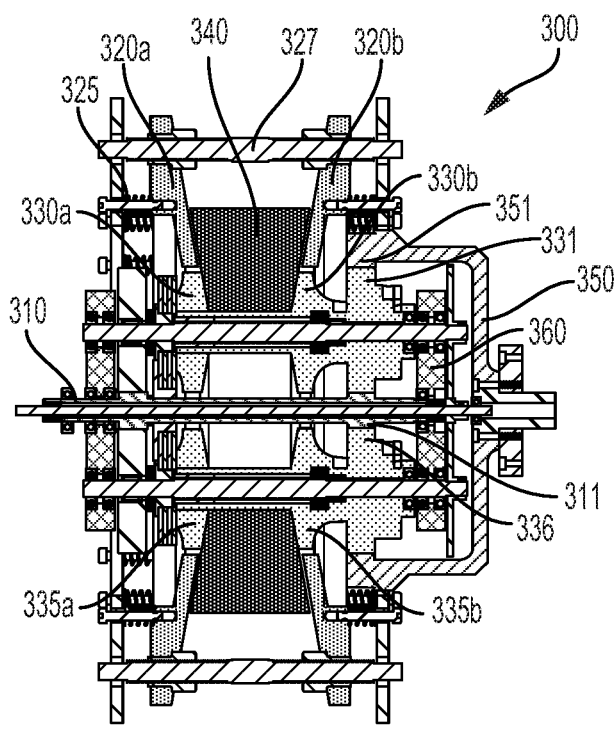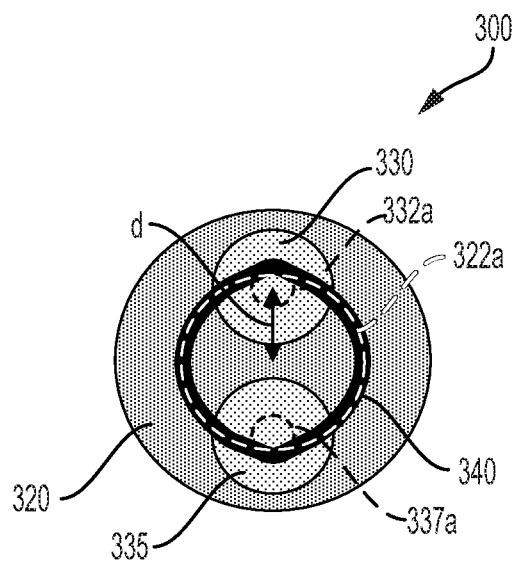
FIG. 3A   FIG. 3B
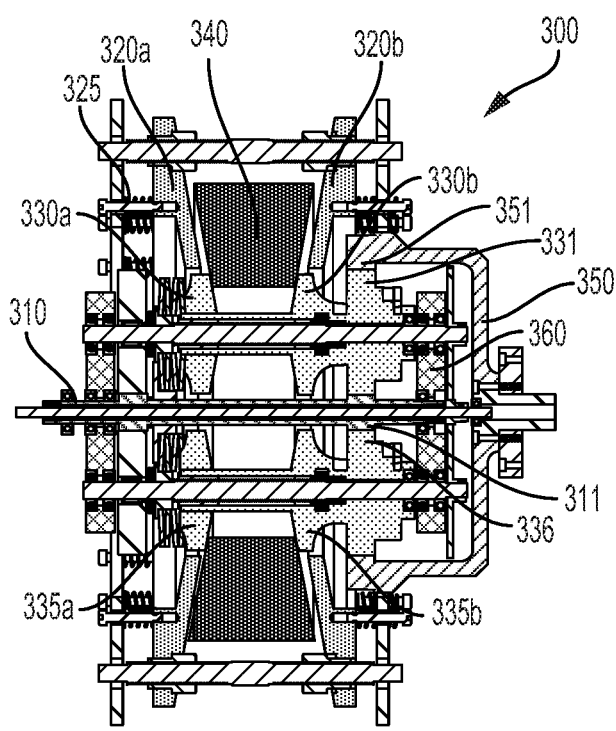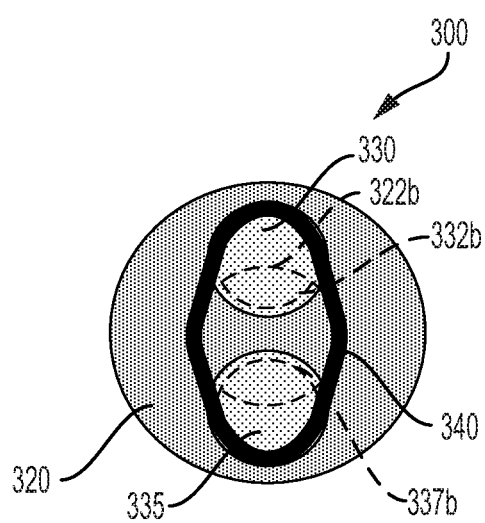
FIG. 3C   FIG. 3D

VARIABLE TRANSMISSIONS WITH NESTED PULLEYS

CROSS-REFERENCE TO RELATED APPLICATION

This application claims priority to U.S. Provisional Patent Application No. 62/674,278, filed May 21, 2018, which is incorporated herein by reference.

BACKGROUND

Unless otherwise indicated herein, the materials described in this section are not prior art to the claims in this application and are not admitted to be prior art by inclusion in this section.

Transmissions are included as part of a variety of mechanisms in order to provide a mechanical advantage between an input torque and an output torque. Thus, a transmission may be included to match properties of a motor, engine, turbine, or other torque generator (e.g., a torque-speed curve, an efficiency curve) to properties of an effector, a wheel, a generator, or some other intended application for a generated torque. For example, a transmission may be provided in an automobile to match the high rotational speed and relatively lower torque generated by an internal combustion engine to lower speed and higher torque requirements for driving the wheels of automobile. In another example, a transmission may be provided to couple an internal combustion engine to a generator such that both the internal combustion engine and the generator are operated according to respective efficient rotational speeds, etc.

A transmission may have a set transmission ratio (the ratio of the rotation speed and/or applied torque at an input of the transmission to the rotation speed and/or delivered torque at an output of the transmission) or may have a controllable transmission ratio. The transmission ratio of such a transmission may be controllable via electronic, mechanical, hydraulic, and/or other methodologies (e.g., via actuation of a clutch, slidable gear(s), split pulley, drum, turbine vane(s), hydraulic valve(s), or other elements of the transmission by a motor, solenoid, or other methodologies). In some examples, a transmission may have a discrete number of selectable transmission ratios (or "gears") that can be selected by operating one or more clutches or other actuators. In other examples, a transmission may have a transmission ratio that is continuously controllable across a range of transmission ratios; such transmissions may be referred to as "continuously variable transmissions." Such variable transmissions may include split pulleys, toroidal drums, hydrostatic elements, or other actuatable components to permit continuous control of the transmission ratio across the range of transmission ratios.

A differential is a device that permits the distribution of an applied torque and/or rotation across multiple different outputs and/or the combination of multiple different applied torques and/or rotations to a single output. A differential may be configured in a variety of ways to provide a specified distribution of torques/rotations between the input(s) and output(s) of the differential. For example, a differential in an automobile may receive an input torque from the engine of the automobile and distribute that input torque to two wheels (e.g., two front wheels or two back wheels) of the automobile equally, such that equal force is provided against the ground by both wheels when the automobile is turning, even though opposite wheels may undergo unequal rotations during a turn.

SUMMARY

A variable transmission can include multiple split pulleys connected via a belt. By controlling the axial distance between half-pulleys of the split pulleys, the effective diameters at which the belt engages with the split pulleys can be adjusted, thus changing the overall transmission ratio of the transmission. To reduce the size of the transmission, to provide a range of transmission ratios that includes both forward and reverse ratios, or to provide other benefits, one of the split pulleys (an 'inner split pulley') may be nested within the other split pulley (an 'outer split pulley'). In such configurations, the inner pulley in such a transmission typically engages in trochoidal motion within the transmission, rotating about an axis of rotation that, itself, orbits about a central axis of rotation of the transmission at a specified distance from the central axis of rotation. The inner split pulley of such a transmission could be driven by an input member (e.g., via an off-center cam), and power can be extracted from the inner split pulley via an offset shaft coupling or some other mechanism.

However, at high speeds such a nested split pulley transmission may exhibit vibration, the transmission of large unbalanced forces through bearings of the transmission, or other unwanted effects due to the off-center nature of the inner split pulley. To alleviate these issues, the nested split pulley transmission can include multiple inner split pulleys. The inner split pulleys could be arranged at regular intervals about a central rotational axis of the transmission in order to balance the masses of the inner split pulleys, to balance forces exerted on the inner split pulleys by a belt of the transmission, or to provide other benefits. Such a transmission could include two, three, or more inner split pulleys. Rotations can be coupled into and out of such a transmission via a planetary gearset in which planet gears are coupled to respective inner split pulleys of the transmission.

A variety of methods and mechanisms are available to facilitate the control and adjustment of the transmission ratio of such a balanced nested split pulley transmission. In some examples, such a mechanism could include a differential. Such a differential could permit two inputs to effect shifting through differential rotation/torque between the inputs and to effect driving of the transmission via in-common rotation/torque of the inputs. The use of such a differential could provide a number of benefits, including the ability to minimize the number of actuators necessary to both drive and effect shifting of the transmission, the ability to apply the torque and/or power rating of two drive motors to effect transmission ratio shifting (e.g., to effect shifting more quickly), the ability to use energy from the output of the transmission to assist in shifting the transmission ratio, the ability to apply actuator power to drive the output of the transmission when such power is not being applied to effect transmission ratio changes, among other benefits.

Some embodiments of the present disclosure provide a transmission having a reduced volume and a controllable transmission ratio to achieve at least one of reduced size, reduced weight, reduced cost or increased efficiency, the transmission including: (i) an outer conical split pulley having a first half-pulley and a second half-pulley; (ii) two or more inner conical split pulleys, each inner conical split pulley having a respective first half-pulley and second half-pulley; (iii) a belt, wherein the belt is in contact with the outer conical split pulley and with at least one of the inner conical split-pulleys; (iv) a first input member; and (v) a first output member coupled to the first input member via at least one of the two or more inner conical split pulleys such that torque can be transmitted between the first input member and the first output member.

Some embodiments of the present disclosure provide a transmission having a reduced volume and a controllable transmission ratio to achieve at least one of reduced size, reduced weight, reduced cost or increased efficiency, the transmission including: (i) an outer conical split pulley having a first half-pulley and a second half-pulley, wherein the wherein the outer conical split pulley is coupled to a mechanical ground such that the first and second half-pulleys of the outer conical split pulley are prevented from rotating; (ii) two or more inner conical split pulleys, each inner conical split pulley having a respective first half-pulley and second half-pulley; (iii) two or more planet gears, wherein each planet gear of the two or more planet gears is coupled to a respective inner split pulley of the two or more inner split pulleys; (iv) a belt, wherein the belt is in contact with the outer conical split pulley and with at least one of the inner conical split-pulleys; (v) a first input member; (vi) a first output member; (vii) a sun gear coupled to the first input member; and (viii) a ring gear coaxial with the sun gear and coupled to the first output member, wherein the ring gear is coupled to the two or more planet gears and the sun gear is coupled to the two or more planet gears such that a torque at the sun gear causes a torque to be realized at the first output member.

These as well as other aspects, advantages, and alternatives, will become apparent to those of ordinary skill in the art by reading the following detailed description, with reference where appropriate to the accompanying drawings. Note that, when used herein to identify pulleys of a transmission, the words 'inner' and 'outer' are applied to facilitate identification of elements of the transmission and are intended to have meanings broader than their ordinary meanings. An 'inner' pulley need not be wholly contained within (e.g., with respect to their respective outer circumferences) an 'outer' pulley. An 'inner' pulley need not be 'more' enclosed than an 'outer' pulley. Indeed, the diameters and degree of relative overlap of 'inner' and 'outer' pulleys of a transmission as described herein may be identical. An 'inner' pulley of a transmission as described herein may extend beyond an outer circumference of an 'outer' pulley of the transmission.

BRIEF DESCRIPTION OF THE DRAWINGS

FIG. 3A is a cross-sectional view of an example variable transmission.

FIG. 3B is another cross-sectional view of the variable transmission depicted in FIG. 3A.

FIG. 3C is a cross-sectional view of the variable transmission depicted in FIG. 3A following a change in the transmission ratio of the transmission.

FIG. 3D is another cross-sectional view of the variable transmission depicted in FIG. 3C.

DETAILED DESCRIPTION

Figure 1A:
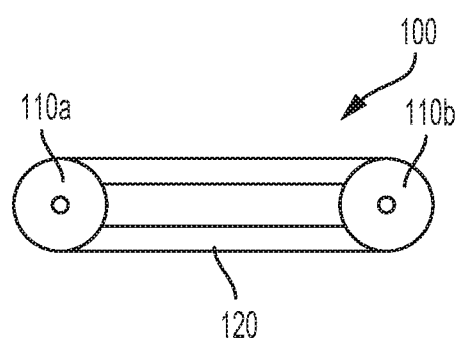
FIG. 1A is a side view of an example variable transmission.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. EXAMPLE VARIABLE TRANSMISSIONS

A mechanical transmission provides a coupling between an input and an output that is characterized by a transmission ratio. The transmission ratio characterizes the relationship between the rotational speed and torque at an input of the transmission to the rotational speed and torque at the output of the transmission. A transmission may thus be provided to modify the speed/torque of a rotation provided by a motor (or other torque-generating device), to control an overall impedance of an actuator or robot element, to increase the efficiency of an apparatus by permitting a motor to operate at a more efficient speed/torque, or to provide some other benefit. For example, a transmission is provided in an automobile to convert the high-speed, relatively low-torque output of an internal combustion engine to a lower-speed, higher-torque output to drive the wheels of the automobile. In another application, a transmission having a high transmission ratio may be provided in a robot arm to permit a very high speed, low-torque motor to provide a very high torque at a joint of the robot. Such a high speed, low-torque motor, combined with the transmission, may provide benefits including higher efficiency, lower overall mass, lower cost, or other benefits relative to the use of a high-torque motor without a transmission.

It can be desirable in a variety of applications to adjust the transmission ratio of a transmission during operation. For example, the transmission ratio could be controlled to adapt to changes in the torque and/or rotation speed to be provided at the output of the transmission (e.g., as the speed of an automobile increases), to maintain a driving motor within an efficient operational regime (e.g., high speed, low torque for an electrical motor), to adapt the effective impedance of the motor/transmission combination (e.g., to provide additional safety when a human interacts with a robot), or to provide some other benefit. In order for the transmission ratio of the transmission to be controllable, the transmission could include clutches, linear actuators, multiple different gear trains/planetary gear sets, or other elements that can be actively or passively operated electrically, mechanically, and/or hydraulically to effect changes in the transmission ratio. Such changes in transmission ratio could be between a number of different discrete transmission ratios. Alternatively, the transmission could be a continuously variable transmission configured to permit adjustment of the transmission ratio across a continuous range of transmission ratio values.

A continuously variable transmission can provide a number of benefits. For example, the transmission ratio may be controlled to an arbitrary value within a possible range of transmission ratios, rather than to a nearest value of a discrete set of transmission ratios provided by a non-continuously variable transmission. Accordingly, a continuously variable transmission permits the transmission ratio to be controlled to an optimal ratio such that a driving motor may be operated according to a high-efficiency speed/torque across a wide range of output speeds/torques. A continuously variable transmission may provide other benefits.

A transmission may be configured in a variety of ways to enable continuous control of transmission ratio across a range of transmission ratio values. In some embodiments, this may be achieved by controlling the effective diameter of one or more pulleys within the transmission. By controlling the effective diameter of a pulley, the ratio of rotation of that pulley relative to other elements (e.g., other pulleys) within the transmission, and thus the transmission ratio of the transmission, may be controlled.

In some examples, the pulley can be a split pulley having two half-pulleys. The half-pulleys have a common axis of rotation and each has an opposite conical (or otherwise-shaped) bearing surface that is in contact with a belt. The belt (e.g., a belt having a v-shaped cross-section) can thus drive, or be driven by, the split pulley. The effective diameter of the split pulley is related to the radius at which the belt contacts the half-pulleys. Thus, the effective diameter of the split pulley may be adjusted by changing the axial distance between the half-pulleys. By increasing the axial distance, the belt will contact the bearing surfaces of the half-pulleys closer to the axis of the split pulley, resulting in a reduced effective diameter. Conversely, the axial distance could be decreased such that the belt will contact the bearing surfaces of the half-pulleys farther from the axis of the split pulley, resulting in an increased effective diameter. The belt can be in contact with another pulley (e.g., another split pulley) to facilitate the realization of torque/rotation at an output (e.g., coupled to the additional pulley) in response to torque/rotation applied at an input (e.g., coupled to the first split pulley). The transmission ratio of such a transmission can be related to the ratio between the effective diameters of the pulleys with respect to their interaction with the belt. Tension in the belt may be maintained by adjusting the effective diameter of both pulleys, by having a tensioner pulley, or by other methodologies.

Figure 1B:
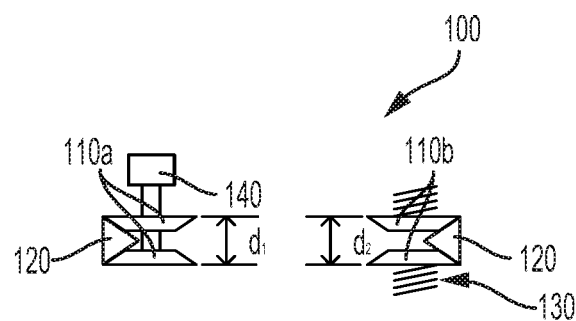
FIG. 1B is a top view of the variable transmission shown in FIG. 1A.

Relevant aspects of split pulleys are illustrated by way of example in FIGS. 1A-D. FIG. 1A shows a side view of a variable transmission 100 during a first period of time; FIG. 1B shows a top view of the transmission during the first period of time. The transmission 100 includes a first split pulley 110a having two half-pulleys, a second split pulley 110b having two half-pulleys, and a v-shaped belt 120 in contact with both split pulleys 110a, 110b. As shown in FIG. 1B, the axial distance between the two half-pulleys of the first split pulley 110a is $d_1$ and the axial distance between the two half-pulleys of the second split pulley 110b is $d_2$. A motor 140 is coupled to the first split pulley 110a to drive the transmission 100. As shown in FIG. 1A, the first 110a and second 110b split pulleys may have the same effective diameter, and thus the transmission ratio of the transmission 110 during the first period of time is 1:1.

Figure 1C:
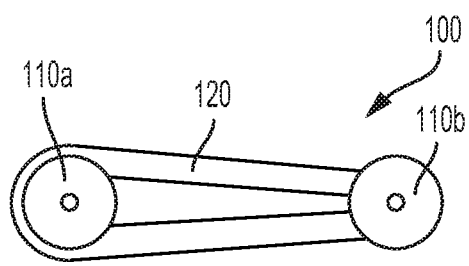
FIG. 1C is a top view of the variable transmission shown in FIG. 1A, after having undergone a shift in transmission ratio.
Figure 1D:
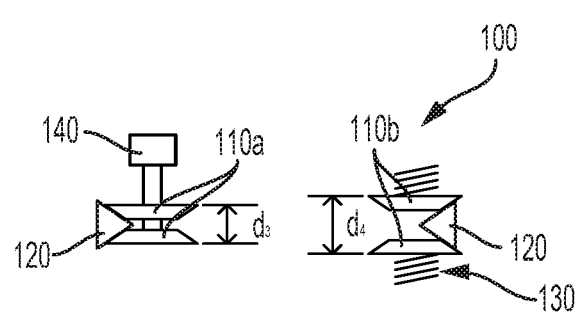
FIG. 1D is a top view of the variable transmission shown in FIG. 1C.

In this example, the effective diameter of the first split pulley 110a can be controlled by controlling an axial distance between the half-pulleys of the first split pulley 110a, and the effective diameter of the second split pulley 110b can be controlled by controlling an axial distance between the half-pulleys of the second split pulley 110b. The result of changing these effective diameters (relative to FIGS. 1A and 1B) is shown in FIG. 1C, which shows a side view of the variable transmission 100 during a second period of time, and FIG. 1D, which shows a top view of the variable transmission 100 during the second period of time. As shown in FIG. 1D, the axial distance between the half-pulleys of the first split pulley 110a has decreased from $d_1$ to $d_3$, resulting in an increase in the effective diameter of the first split pulley 110a, and the axial distance between the half-pulleys of the second split pulley 110b has increased from $d_2$ to $d_4$, resulting in a decrease in the effective diameter of the second split pulley 110b. These changes in the effective diameters of the split pulleys 110a and 110b increase the transmission ratio of the transmission 100 (e.g., from a 1:1 transmission ratio in FIGS. 1A and 1B to a 3:1 transmission ratio in FIGS. 1C and 1D).

Control of the axial distance between the half-pulleys of a split pulley (e.g., 110a) may be effected in a variety of ways by a variety of mechanisms, examples of which are described below. Accordingly, the effective diameter of the first split pulley 110a and/or the effective diameter of the second split pulley 110b may be controlled, thus controlling the transmission ratio of the transmission 100. As the effective diameter of the first split pulley 110a is changed, tension in the belt 120 may be maintained using an idler pulley, by changing the effective diameter of the second split pulley 110b, and/or by varying the axle-to-axle distance between split pulleys 110a and 110b. This may be effected in a variety of ways (e.g., by employing an actuator to independently control the axial distance between the half-pulleys of the second split pulley 110b, by using a mechanism to couple the axial distances of the two split pulleys 110a, 110b together such that controlling one axial distance effects control of the other, by using a passive mechanism including springs or other elastic elements). As shown in FIG. 1B, half-pulleys of the second split pulley 110b are coupled together via an elastic element 130 (e.g., a spring, coupled between a thrust bearing on the half-pulley and a mechanical ground of the transmission 100) such that an axial force is exerted between the half-pulleys of the second split pulley 110b. As the effective diameter of the first split pulley 110a changes, resulting changes in the tension in the belt 120 may interact with the axial force exerted by the elastic element 130 to effect a corresponding but opposite change in the effective diameter of the second split pulley 110b.

The arrangement of split pulleys, shown in FIGS. 1A-D, to form a variable transmission is intended as a non-limiting example embodiment. Such a transmission may be improved by configuring the split pulleys, belts, motors, shifting mechanisms, or other elements of such a transmission and/or of elements coupled thereto in alternative ways. For example, an improved variable transmission can be provided by nesting one of the split pulleys within the other. That is, some overlap occurs between outer circumferences of the pulleys. Such nesting can include the axis of rotation of one of the pulleys (the 'inner' pulley) being located within the outer circumference of the other pulley (the 'outer' pulley), or the entirety of one of the pulleys being located within the outer circumference of the other pulley (a 'fully nested' arrangement). In such examples, depending on the size of the 'inner' and 'outer' pulleys in such a configuration, the 'inner' pulley may partially extend beyond the outer circumference of the 'outer' pulley. Such a configuration could provide a variety of benefits. For example, by nesting one split pulley (the 'inner' split pulley) within the other (the 'outer' split pulley), the overall size of the transmission could be reduced. This can be of benefit in automotive and robotic applications, where the volume and weight of the transmission may be reduced compared to the non-nested split pulley designs employed in automotive applications or the fixed-ratio planetary, harmonic, or otherwise-configured transmission designs employed in robotic applications. Additionally, such a nested design can allow the transmission to have a controllable range of transmission ratios that includes forward and reverse ratios as well as a neutral (or 'non-driven output') configuration.

In such a nested arrangement, the outer pulley could be rotationally grounded (i.e., the half-pulleys of the outer pulley could be prevented from rotating) and the inner pulley could be driven, by one or more inputs, via a cam such that rotation of the input(s) caused the inner split pulley to orbit about a rotational axis of the input(s) (e.g., to engage in trochoidal motion and rotation). An output member could then be coupled to the inner split pulley (e.g., to one or both half-pulleys of the inner split pulley via a cage gear, a sun and/or ring gear, a planet carrier, an additional belt, or other methodologies) to permit realization of rotation and/or torque at the output member in response to the application of torque/rotation at the input member. Such a transmission could provide a variety of benefits, including reduced size, high transmission ratios, reversible transmission ratios, a neutral transmission ratio that decouples the input from the output, or other benefits.

Such a transmission may also allow for smaller changes in the axial separation of the split pulley halves to effect greater changes in the transmission ratio of the transmission, relative to a non-nested split pulley CVT configuration. Accordingly, the nested-pulley configuration may allow for increased speed in shifting the transmission ratio. Such increased shifting speed may provide a number of benefits, including increasing the safety of a robot by allowing the impedance of the robot's joints (and thus the effective impedance of the robot's limbs) to be continuously adjusted to increase the safety of the robot to any nearby humans (e.g., by reducing the impedance of the robot limb when in contact with a human).

In some examples, such a transmission could be configured such that it is controllable to have a transmission ratio of neutral or zero (i.e., that rotation of the input results in no rotation of the output) and/or to have negative transmission ratios (i.e., the transmission ratio of the transmission is controllable such that the direction of rotation of the output, relative to the input, is invertible). Such a transmission, having a transmission ratio that is controllable across a range of transmission ratio values that includes zero, may be referred to as an "infinitely variable transmission." Such a transmission may allow for braking or reversal of the direction of the transmission output without clutches, reducing the size and cost of the transmission relative to designs used, e.g., in automotive and robotics applications to provide reverse gearing, where multiple transmissions/gears and attendant clutches may be provided to allow for high torque and low speed operation in both directions.

Figure 2:
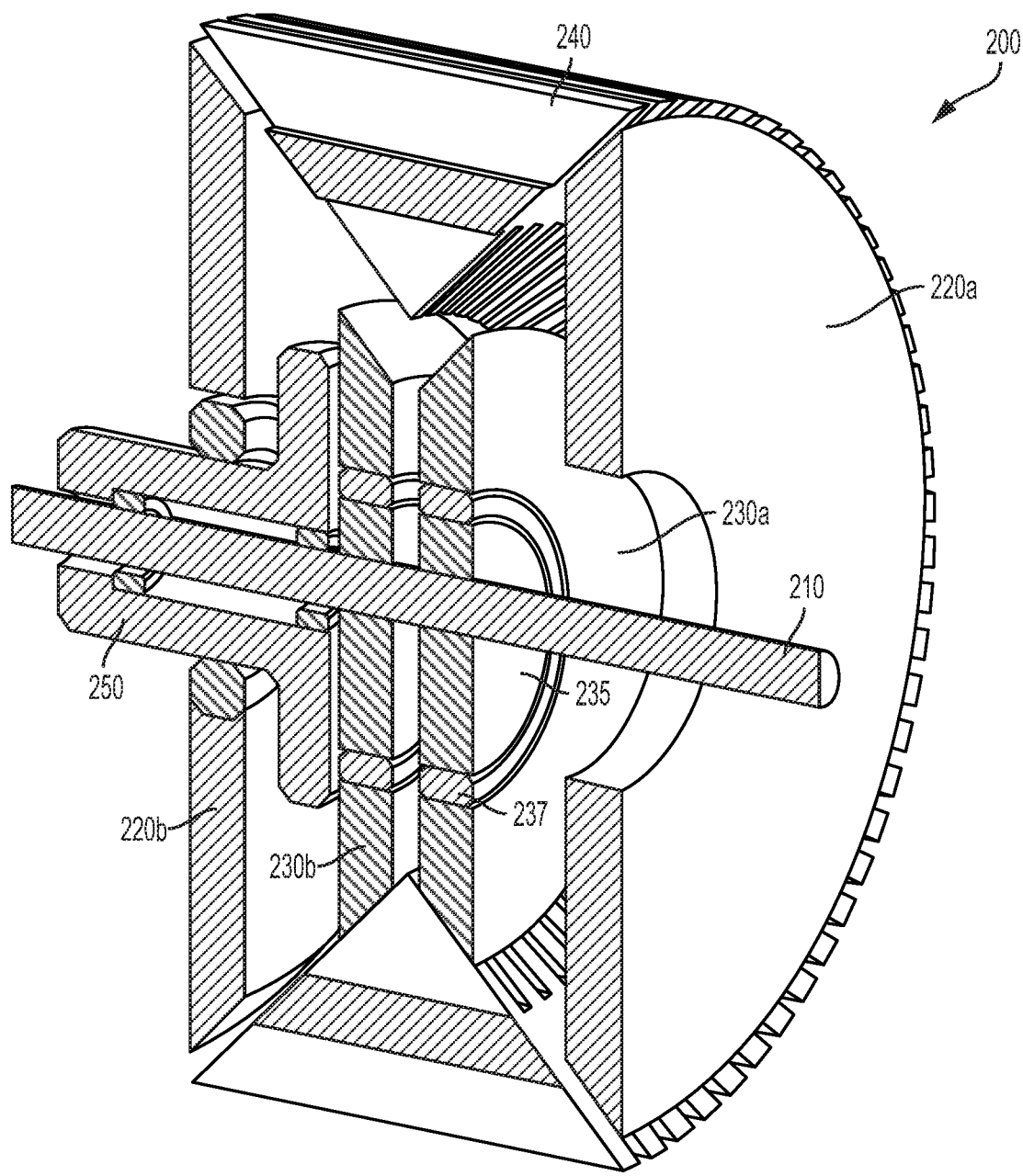
FIG. 2 is a perspective cross-sectional view of an example variable transmission.

An example of such a transmission is illustrated in FIG. 2. A variable transmission 200 includes a first split pulley having first 230a and second 230b half-pulleys. The transmission 200 additionally includes a second split pulley having third 220a and fourth 220b half-pulleys. The first and second split pulleys are coupled via a belt 240. The first split pulley is nested within the outer split pulley. This includes an axis of rotation of the first split pulley being located within an outer perimeter of the second split pulley. An input member 210 is coupled to the first split pulley via a cam 235 and a cam bearing 237. The input 210 and the first split pulley have respective different, offset axes of rotation. Rotation of the input 210 results in translation of the axis of rotation of the first split pulley about the axis of rotation of the input 210, rotation of the half-pulleys 230a, 230b, and a transmission of torque from the first split pulley to the second split pulley via the belt 240. Thus, rotation of the input 210 may result in cycloidal or some other variety of trochoidal motion of a particular portion of the first split pulley (e.g., of a particular point on the first half-pulley 230a).

The transmission 200 additionally includes an output member 250. The transmission 200 may be configured to generate a rotation and/or torque at the output member 250 in response to an applied rotation and/or torque at the input member 210 according to a controllable transmission ratio by mechanically grounding the half-pulleys of the second split pulley 220a, 220b to prevent them from rotating and by coupling the output member 250 to at least one of the half-pulleys of the first split pulley 230a, 230b such that rotation of the first split pulley results in rotation of the output member 250. This could include configuring the output member 250 as a cage gear configured to couple with corresponding elements (e.g., a plurality of formed holes) of a half-pulley 220a, 220b of the first split pulley.

Note that, while the transmissions described herein are characterized as including inputs from which power is transmitted to outputs, these transmissions may additionally or alternatively be configured to be back-drivable or otherwise configured to permit bidirectional energy transmission and/or energy transmission from output(s) to input(s). For example, transmissions as described herein could be used to bidirectionally transfer energy between joints of a robot, e.g., to increase the overall efficiency of the robot by permitting energy to be harvested from one joint (e.g., a joint currently receiving energy from, e.g., contact with the ground) and applied to another joint (e.g., a joint currently being employed to exert force on a payload), or vice versa. Additionally, such a configuration could permit multiple degrees of freedom (e.g., of one or more joints of a robot)

to be driven by a single motor (e.g., via respective nested-pulley infinitely variable transmissions).

II. EXAMPLE BALANCED VARIABLE TRANSMISSIONS

A nested pulley transmission as described above, having a single inner split pulley, can provide a variety of benefits. However, the use of a single inner split pulley can lead to unwanted effects. For example, the off-center mass of the inner split pulley can result in vibration, especially at high speeds, and the resultant time-varying forces and torques can have unwanted effects on the transmission and on elements coupled to the transmission. This can result in increased wear, reduced lifetime, increased component cost, increased noise, reduced efficiency, or other unwanted effects. This effect can, in some embodiments, be wholly or partially alleviated by the addition of a counterweight to balance the off-axis mass of the inner split pulley, Additionally, unbalanced forces and/or torques applied to the off-center inner split pulley can result in significant loads being transmitted through bearings, including bearings that may be required to operate at high speed.

To address these issues, a nested split pulley transmission as described herein could include multiple inner split pulleys arranged in a balanced configuration. For example, such a transmission could include two inner split pulleys arranged opposite each other within the transmission such that the masses of the inner split pulleys are balanced when the transmission is operated. Accordingly, this transmission configuration could reduce vibration. Correspondingly, such a transmission could be operated at higher speeds, at greater efficiency, could include fewer and/or less expensive bearings, or offer improved characteristics in some other way.

Such a balanced split pulley transmission could also exhibit reduced load forces transmitted through bearings of the transmission. This is because forces exerted onto the inner split pulleys (e.g., from the outer split pulley, transmitted via the belt) could fully or partially balance. Accordingly, such forces (e.g., between one of the inner split pulleys and the outer split pulley) would not need to be balanced via forces exerted through bearings of the transmission. As a result, the size, weight, number, and/or cost of such bearings could be reduced and/or the transmission could be operated at higher speeds and/or torques. Additionally, the strength, size, mass, and/or cost of elements of the housing of the transmission used to couple such balancing forces could be reduced.

FIGS. 3A-D show an example balanced nested split pulley transmission 300 having two inner split pulleys 330, 335 and an outer split pulley 320. FIGS. 3A and 3C show the transmission 300 according to a first cross-sectional view, while FIGS. 3B and 3D show a simplified schematic of the transmission 300 according to a cross-sectional view that is perpendicular to the cross-sectional view of FIGS. 3A and 3C. FIGS. 3A and 3B illustrate the transmission 300 when the transmission 300 is in a first configuration, thereby exhibiting a first transmission ratio (e.g., a reverse transmission ratio). FIGS. 3C and 3D illustrate the transmission 300 when the transmission 300 is in a second configuration, thereby exhibiting a second transmission ratio (e.g., a forward transmission ratio) that differs from the first transmission ratio.

The outer split pulley 330 includes first 320a and second 320b half-pulleys that are in contact with a belt 340. The first inner split pulley 330 includes first 330a and second 330b half-pulleys that are in contact with the belt 340 and the second inner split pulley 335 includes first 335a and second 335b half-pulleys that are also in contact with the belt 340. An input member 310 can drive an output member 350 by the transmission of torques through the transmission 300 via the inner split pulleys 330, 335 and other elements of the transmission 300. The input member 310 is coupled (e.g., fused) to a sun gear 311 that is in geared contact with first 331 and second 336 planet gears that are coupled to the first 330 and second 335 inner split pulleys, respectively. The first 331 and second 336 gears are also in geared contact with a ring gear 351 that is coupled to the output member 350. The relative locations of the inner split pulleys 330, 335 are maintained in part by a planet carrier 360.

As shown, the transmission 300 is configured to realize a torque/rotation at the output member 350 in response to an applied torque/rotation at the input member 310 by transmitting torques between the sun gear 311 and the planet gears 330, 335 and between the planet gears 330, 335 and the ring gear 351. This realization of torque at the output is caused by torques transmitted between the mechanically grounded outer split pulley 320 and the inner split pulleys 330, 335 via the belt. The transmission 300 may be configured to be backdrivable, such that torques/rotations may be realized at the input member 310 in response to torques/rotation applied at the output member 350.

Note that the configuration of a nested, balanced split pulley transmission shown in FIG. 3 is intended as a non-limiting example of a nested, balanced split pulley transmission. Input and output members may be coupled, alternatively, to sun gears, planet carriers, ring gears, output split pulleys, and/or other elements of the transmission 300, with appropriate complementary elements rotationally grounded, according to an application. For example, the ring gear 351 could be grounded and the outer split pulley 320 could be allowed to rotate. In such an example, an output member could be coupled to the outer split pulley 320 and rotations and/or torques could be realized at the outer split pulley 330 due to rotations and/or torques applied at the input member 310 due to the operation of the transmission 300. Such alternatively configurations of a nested, balanced split pulley transmission may be selected in order to set the range of transmission ratios available to the transmission, to reduce parts counts or otherwise reduce cost of the transmission, to simplify assembly of the transmission, to match the volume or size of the transmission to an application, or to provide some other benefit.

An overall transmission ratio of the transmission 300 between the input member 310 and the output member 350 is related to a variety of factors including the gear ratio between the sun gear 311 and the planet gears 331, 336, the gear ratio between the planet gears 331, 336 and the ring gear 351, and a ratio between the 'effective diameters' of the outer split pulley 320 and the inner split pulleys 330, 335. The 'effective diameter' of one of the outer split pulley 320 or inner split pulleys 330, 335 is the diameter of the pulley at which the belt 340 (e.g., a center line, a line at which a central band of flexible and substantially non-extensible material runs through the belt, or some other line of flexion or curvature) contacts the half-pulleys of the split pulley.

When the belt 340 is under tension, the effective diameter of a particular split pulley, with respect to its interaction with the belt 340, will be related to the axial distance between the half-pulleys of the particular split-pulley. This is illustrated by FIGS. 3B and 3D, which show the first 330 and second 335 inner split pulleys and the outer split pulley 320. FIG. 3B shows, during a first period of time when the transmission is exhibiting a first transmission ratio, the effective diameters of the inner split pulleys 332a, 337a and the effective diameter of the outer split pulley 322a. The belt 340, being under tension, conforms to the inner 330, 335 and outer 320 split pulleys along their respective effective diameters to provide a first transmission ratio (e.g., a reverse transmission ratio) during the first period of time. FIG. 3D shows, during a second period of time when the transmission is exhibiting a second transmission ratio, the effective diameters of the inner split pulleys 332b, 337b and the effective diameter of the outer split pulley 322b. The effective diameters of the inner split pulleys have increased relative to FIG. 3B, while the effective diameter of the outer split pulley has decreased. The belt 340, being under tension, conforms to the inner 330, 335 and outer 320 split pulleys along their respective effective diameters to provide a second transmission ratio (e.g., a forward transmission ratio) during the second period of time that differs from the transmission ratio during the first period of time.

The axial distances between the respective half-pulleys of the outer split pulley and the inner split pulleys can be adjusted to control the diameters at which the split pulleys 320, 330, 335 contact the belt 340. Accordingly, the overall transmission ratio of the transmission 300 can be controlled across a range of transmission ratios. For example, the effective diameter of the outer split pulley is determined by a combination of the tension in the belt 340, the strength of optional springs 325 (or other elastic elements) that couple between the half-pulleys 320a, 320b of the outer split pulley, and the setting of differently pitched (e.g., threaded and reverse-threaded) lead screws (e.g., 327) that engage with threads of the half-pulleys 320a, 320b of the outer split pulley. Accordingly, the effective diameter of the outer split pulley can be controlled by rotating the lead screws 327 to adjust the axial distance between the half-pulleys 320a, 320b of the outer split pulley. Note that the axial distance between half-pulleys of a split pulley as described herein may be controlled only by active means (e.g., a lead screw 327), only by passive means (e.g., a spring 325), or by a combination of active and passive means. Such methods may additionally or alternatively be used to control the effective diameter of the inner split pulleys. Additionally or alternatively, other methods of providing a passive elastic force and/or an active positioning force between half-pulleys of a split pulley can be used.

The range of transmission ratios can include positive and negative (i.e., forward and backward) transmission ratios, and may include one or more 'neutral' transmission ratios at which torques/rotations are not realized at the output member 350 in response to the application of torques/rotations at the input member 310. The axial distances between the respective half-pulleys of the outer split pulley and/or between the respective half-pulleys of the inner split pulleys can be controlled using a variety of mechanisms.

During operation of the transmission 300, the inner split pulleys 330, 335 rotate about respective axes of rotation. The inner split pulleys 330, 335 are disposed within the transmission 300 (e.g., rotationally coupled to one or more planet carriers 360) such that the axes of rotation of the inner split pulleys 330, 335 are disposed regularly (i.e., 180 degrees apart) around a central axis of rotation of the transmission 300 and at a specified distance, d, from the central axis of rotation. The sun gear 311 and ring gear 351 also rotate about the central axis of rotation. The two inner split pulleys 330, 335 are disposed in this way, about the central axis of rotation, in order to substantially balance any reaction forces that may be exerted onto the inner split pulleys 330, 335 by the belt 340 and to balance the masses of the inner split pulleys 330, 335 so as to reduce vibration that may occur when the transmission 300 is operated.

Figure 4:
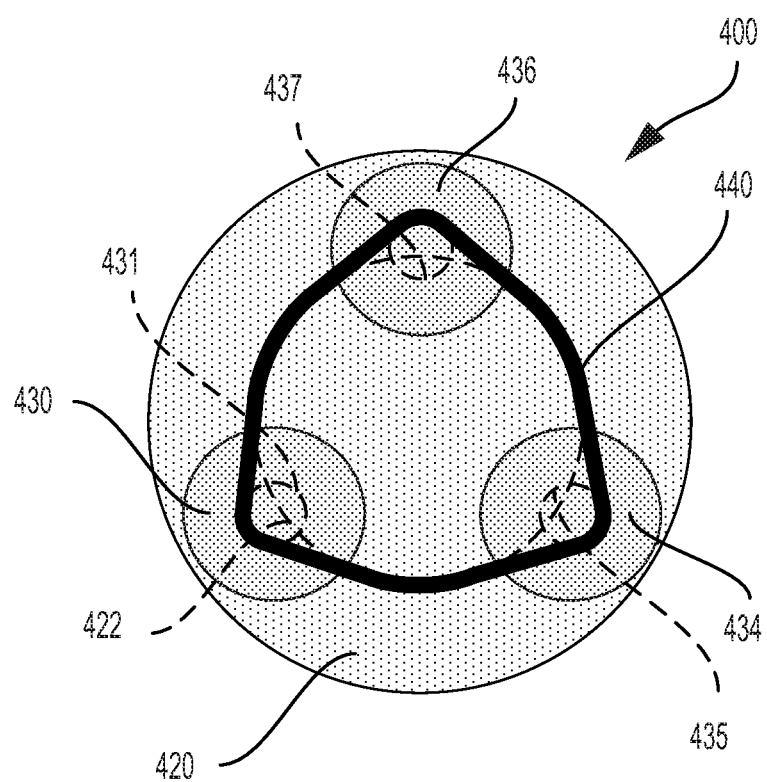
FIG. 4 is a cross-sectional view of an example variable transmission.

Note that a balanced nested split pulley transmission as described herein can include more than two inner split pulleys. Such a transmission could include three, four, or more inner split pulleys according to an application. The inner split pulleys of such a transmission could be distributed regularly about a central axis of rotation. FIG. 4 illustrates, in cross-section, element of a transmission 400 that includes an outer split pulley 420, three inner split pulleys 430, 434, 436, and a belt 440 that is in contact with each of the split pulleys. Axial distances between half-pulleys of the outer split pulley 420 and the inner split pulleys 430, 434, 436 can be adjusted to control the respective effective diameters 422, 431, 435, 437 at which the belt 440 contacts the split pulleys, thereby controlling the transmission ratio of the transmission 400.

As shown, the two, three, or more inner split pulleys of a balanced nested split pulley transmission as described herein can be arranged regularly about a central axis of rotation in order to reduce vibration, to balance forces exerted onto the inner split pulleys, or to provide some other benefit. For example, a two-inner-pulley transmission could have inner pulleys spaced 180 degrees apart, a three-inner-pulley transmission could have inner pulleys spaced 120 degrees apart, a four-inner-pulley transmission could have inner pulleys spaced 90 degrees apart, etc. The inner split pulleys being 'regularly' arranged about a central axis of rotation includes the axes of rotation of the inner split pulleys being disposed about the central axis of rotation at angles that are within ten degrees of mathematical regularity. For example, a transmission having two inner split pulleys could have the inner split pulleys disposed 170 degrees (or, equivalently, 190 degree) from each other about the central axis of rotation. In another example, a transmission having four inner split pulleys could have the inner split pulleys disposed at intervals of 80 degrees, 90 degrees, 100 degrees, and 90 degrees from each other about the central axis of rotation. Similarly, the distances been the axes of rotation of the inner split pulleys and the central axis of rotation may differ from uniformity by a specified amount, e.g., by less than 15% of the mean distance between the central axis of rotation and the axes of rotation of the inner split pulleys.

These slight deviations from perfect regularity and/or uniformity could be done to facilitate fabrication and/or assembly of the transmission, to account for tolerances in manufacturing, to allow for the placement of shifting mechanisms within the transmission, or to provide some other benefit. These benefit(s) may be valued more highly than the slight increase in vibration, unbalanced forces, or other unwanted effects that may accompany disposing the inner split pulleys slightly irregularly within the transmission. In some examples, transmissions exhibiting significant departures from regularity and/or uniformity may be provided in order to allow for the placement of additional mechanisms within the transmission or to provide some other benefit. This may be done in order to access the benefits of such irregular/non-uniform configurations where such benefits outweigh the corresponding reduced effectiveness of the configuration with respect to vibration reduction, balancing of forces exerted onto the inner split pulleys, or the other benefits provided by inner pulleys set in a fully regular and uniform arrangement. Such benefits may include providing a greater torque capacity with space for a mechanical pass-through or some other benefit over either a fully balanced pulley placement.

Additionally, note that nested-pulley transmissions as described herein (e.g., 200, 300) may include non-split inner pulleys. Such transmission may have a fixed transmission ratio. Alternatively, the transmissions ratio of such transmissions may be adjustable, e.g., by adjusting the axial distance between the half-pulleys of the outer split pulley, by adjusting the distance between the axis/axes of rotation of the inner pulley(s) and the central axis of rotation of the transmission, by adjusting a tension in the belt, and/or by using some other means to control the transmission ratio of a transmission as described herein when the inner pulley(s) are not split pulleys.

III. EXAMPLE DIFFERENTIAL SHIFTING MECHANISMS

The transmission ratio of a split pulley variable transmission may be controlled by controlling the axial distance between the half-pulleys of the one or more split pulleys of the transmission. Accordingly, a belt of the transmission will contact bearing surfaces (e.g., conical bearing surfaces of the half-pulleys of a conical split pulley) at different locations, resulting in a change in the effective diameter of the split pulley and a change in the transmission ratio of the transmission. Such bearing surfaces may be configured to provide enhanced traction against the belt, e.g., by including surface textures or roughening, by being composed of a specified material to enhance traction and/or reduce slipping against the belt, or by being configured in some other manner to enhance traction with the belt. Where the variable transmission includes multiple inner split pulleys (e.g., in a balanced arrangement of two, three, or more inner split pulleys), a planetary gearset or some other mechanism may be employed to control, in common, the axial distance between the half pulleys of each of the inner split pulleys. Alternatively, the axial distance of only one of the inner split pulleys could be controlled, with the axial distances of the other split-pulleys being set by a spring or other passive element to follow the axial distance of the controlled split pulley.

A variety of mechanisms may be applied to effect such control of the axial distance between the half-pulleys. In some examples, the split pulley may be driven by two (or more) inputs and a differential may be provided to apportion torque from the two inputs between applying power to drive an output of the transmission and applying power to effect shifting of the transmission ratio of the transmission. For example, such a differential could be configured such that a torque difference between the two inputs causes axial force to be applied, via the differential, between first and second half-pulleys of a split pulley. Accordingly, the axial distance between the first and second half-pulleys could increase or decrease, enabling a change in an effective diameter of the split pulley. By facilitating the control of such changes in the axial distance, the differential permits control of the transmission ratio of the transmission that includes the split pulley. The differential could additionally apply a net torque from the inputs to the split pulley such that the net torque results in the realization of an output torque at an output of the transmission (e.g., due to transmission of torques via a belt, an additional split pulley, and/or other elements).

Such a differential mechanism may provide a variety of benefits. For example, it may permit two high-power drive motors to be applied to both driving the output of a transmission and to effecting changes in the transmission ratio of the transmission. Since the rate at which transmission ratio shifts may occur is related to the power applied to effect the shift, the use of two large, high-power motors may permit very fast shifting. Additionally, when those motors are not being operated "differentially" to shift the transmission ratio, the full power of the two motors may be used to drive the output. Thus, the differential configuration allows for rapid, controllable high-power shifting without requiring a large, high-power motor (and its attendant size, weight, and cost) to be allocated for shifting alone. Additionally, the differential shifter embodiments described herein may be configured to be back-drivable or otherwise configured to permit energy (e.g., torques) received from the output to assist in effecting transmission ratio shifts, further increasing the efficiency of the transmissions.

FIGS. 3-9 illustrate embodiments in which a differential shifter receives two inputs, which may either extend in opposite directions from the differential/split pulley or that may be coaxial and concentric, with one input disposed at least partially within the other (e.g., one input shaft disposed within a hollow center of the other). In other embodiments, the inputs need not be nested in such a manner. These transmission ratio shifting mechanisms may be applied to effect axial separation changes for the "inner" or "outer" split pulleys of a nested-pulley differential (e.g., the nested-pulley transmission having a single inner split pulley of FIG. 2 or the transmission of FIGS. 3A-D having multiple inner split pulleys), or the split pulleys of a variable transmission configured in some other manner (e.g., the variable transmission of FIGS. 1A-1D). These illustrated embodiments are intended as non-limiting examples; any embodiment which illustrates nested inputs may, with appropriate modification, receive inputs extending in opposite directions from the differential, or vice versa.

Further, a transmission as described herein, or an element thereof (e.g., a differential) may include additional or alternative elements to facilitate an application. For example, a transmission may include additional gearing to, e.g., provide a rotation on a different axis, to provide a gear reduction, to distribute a differential and/or shifting force amongst multiple inner split pulleys, or to provide some other mechanical effect. These modifications may be provided to, e.g., control a relationship between the differential torque and the applied transmission ratio-shifting force, to asymmetrically apportion energy from each of the two inputs toward transmission ratio-shifting and/or output driving, to control a mechanical advantage in shifting and/or output driving to one or both inputs, to convert a rotational motion into a linear motion (e.g., to exert an axial force between half-pulleys of a conical split pulley), to control the axial distance between half-pulleys of multiple split pulleys in common, or to provide some other benefit according to an application.

A. Ring Gear Differential Shifter

In some examples, an epicyclic differential could be provided in order to effect a differential shifter as described herein. Planet gears of the epicyclic differential may then be coupled to screws, toothed pins, linear gears or racks, or other mechanical elements so as to couple rotation of the planet gears (as a result of differential rotation of the inputs to the differential) into an axial force/movement between the half-pulleys of a split pulley. In some examples, the half-pulleys could be threaded into each other, and the rotation of the planet gears could be coupled into a relative rotation between the two half-pulleys, effecting a change in the axial distance between the half-pulleys via the threads coupling the half-pulleys together.

Figure 5:
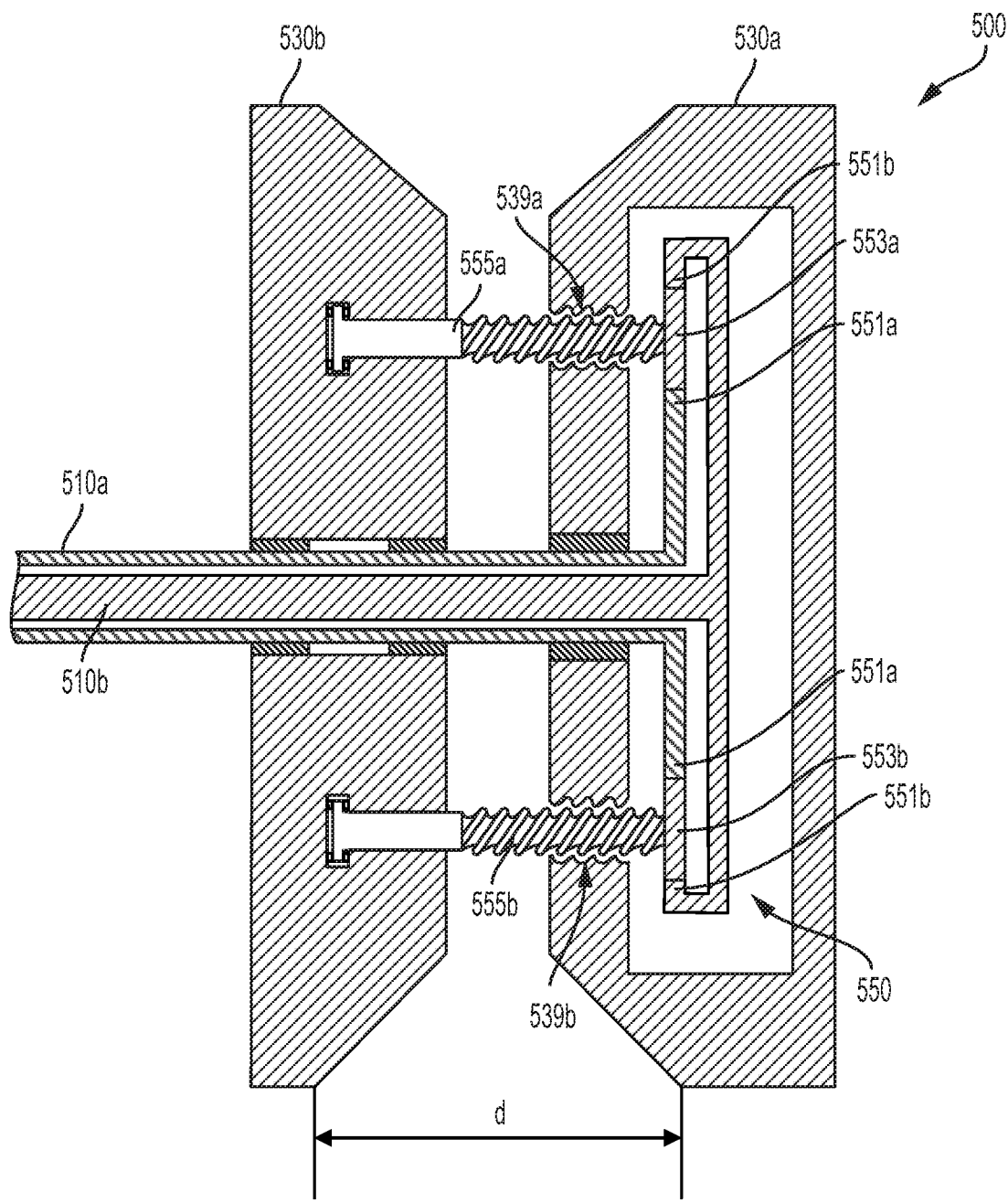
FIG. 5 is a cross-sectional view of an example shifting mechanism of a variable transmission.
Figure 6:
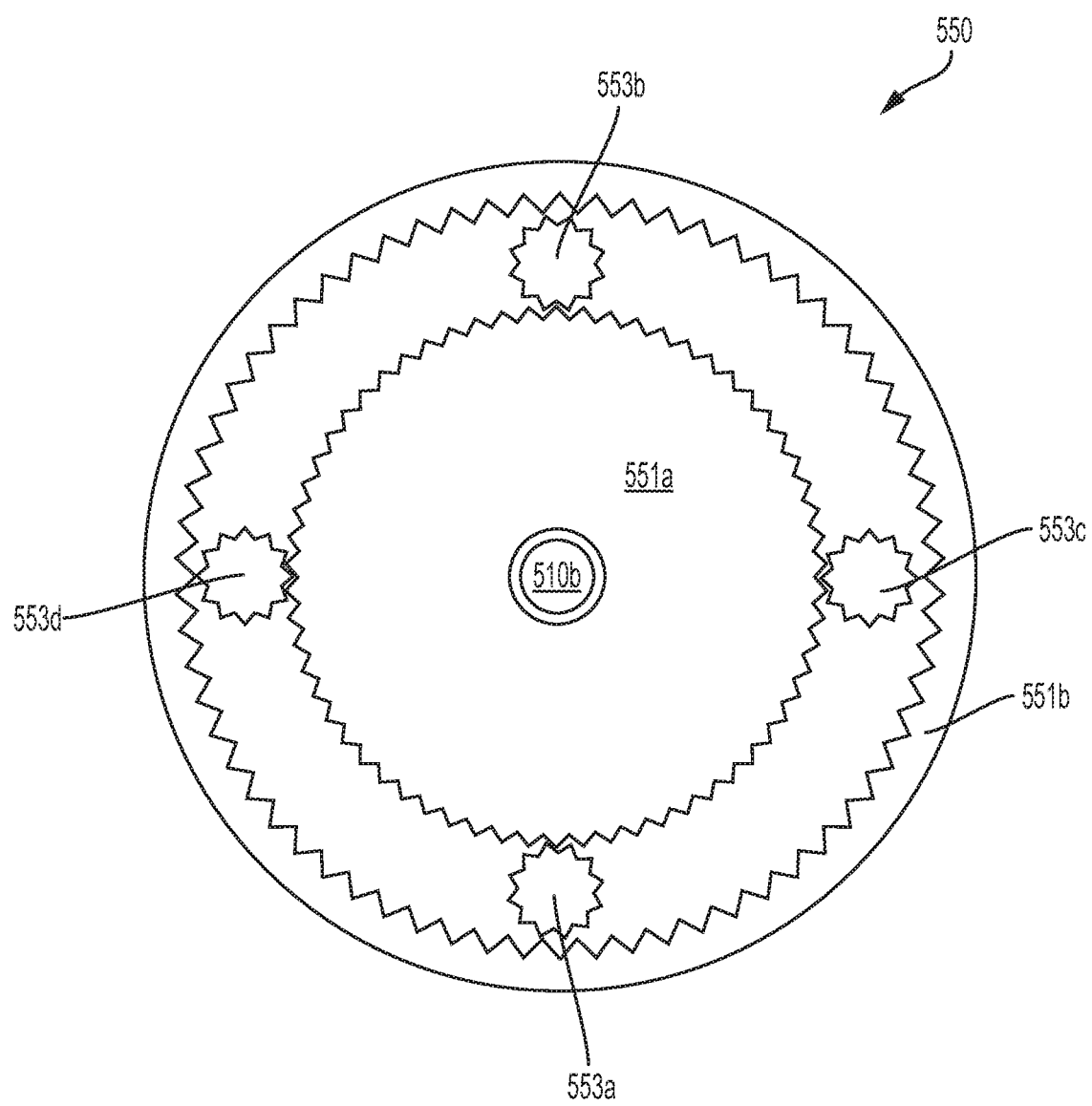
FIG. 6 is a schematic illustration of elements of the example shifting mechanism shown in FIG. 5.

FIG. 5 illustrates, in cross-section, an example split pulley 500 (e.g., a split pulley of a variable transmission) that includes an epicyclic differential 550 coupled to two input members 510a, 510b and to two half pulleys 530a, 530b such that a torque difference between the first input member 510a and the second input member 510b causes an axial force to be applied, via the differential 550, between the first half-pulley 530a and the second half-pulley 530b, thus allowing an axial distance ("d") between the first half-pulley 530a and the second half-pulley 530b to increase or decrease. The first 510a and second 510b input members are coaxial and concentric, and the first input member 510a is disposed partially within the second input member 510b. FIG. 6 shows another cross-sectional view of the differential 550, the view in FIG. 6 being perpendicular to the cross-sectional view provided in FIG. 5.

The differential 550 includes a sun gear 551a and a ring gear 551b. The sun gear 551a and the ring gear 551b are coupled (e.g., fused) to the first 510a and second 710b input members, respectively, such that rotation of an input member results in rotation of a respective one of the sun gear and the ring gear. The differential 550 additionally includes planet gears 553a, 553b, 553c, 553d that engage with the sun gear 551a and ring gear 551b such that a difference in rotation between the first 510a and second 510b input members results in rotation of the planet gears 553a, 553b, 553c, 553d relative to a planet carrier of the differential 550 (not shown).

Rotation of one or more of the planet gears 553a, 553b, 553c, 553d may be coupled into an axial force/motion between the half-pulleys 530a, 530b in a variety of ways. As shown, the planet gears 553a, 553b are coupled (e.g., fused) to respective screws 555a, 555b. The screws 555a, 555b, in turn, are coupled to the first half-pulley 530a via respective threaded holes 539a, 539b such that rotation of the planet gears 553a, 553b, 553c, 553d results in rotation of the screws 551, 555b, thereby enabling a change in the axial distance ("d") between the half-pulleys 530a, 530b. Note that the illustrated threaded holes in FIG. 5 (539a, 539b) and elsewhere herein are intended as non-limiting examples of a threaded hole that can be used to engage with a screw in order to control the axial distance between elements of a transmission. Such a threaded hole may extend all the way through the particular element(s) in which it is formed (as shown in FIG. 5) or the threaded hole may only extend partially through the particular element(s) (e.g., the threaded hole may be formed by tapping a blind hole drilled only partway through a particular element of a transmission).

A net torque provided by the first 510a and second 510b input members may be applied to the half-pulleys 530a, 530b, e.g., to drive a belt of a variable transmission and thus to drive an output of the variable transmission. Such a net torque may be coupled from the inputs to the half-pulleys via a housing of the differential 550, via a force exerted by the screws 555a, 555b onto the half-pulleys, or via some other element(s) of the split pulley 500.

Note that the embodiment shown in FIGS. 5 and 6 is intended only as a non-limiting example. Alternative embodiments are anticipated. For example, the differential 550 could be disposed between the half-pulleys 530a, 530b and could extend additional screws, via respective threaded holes, from the planet gears to engage with threaded portions of the second half-pulley 530a). This could enable axial motion of the half-pulleys 530a, 530b that is symmetric with respect to the planet gear(s) or other elements of the differential 550. A diameter and/or number of teeth of the sun gear, the ring gear, and/or the planet gears could be specified to control a relationship between the differential torque and the applied transmission ratio-shifting force, to asymmetrically apportion energy from each of the two inputs toward transmission ratio-shifting and/or output driving, to control a mechanical advantage in shifting and/or output driving to one or both inputs, or to provide some other benefit according to an application. The example half-pulleys 530a, 530b are coupled, rotationally, to net rotation of the inputs 510a, 510b; however, the half-pulleys 530a, 530b could be coupled to the inputs 510a, 510b via respective cams and cam bearings to facilitate trochoidal motion of the half-pulleys 530a, 530b in response to net rotation of the input members 510a, 510b. In yet another example, the differential shifting mechanisms depicted in FIGS. 5 and 6 may be adapted to control, in common, the axial distance between the half-pulleys of multiple inner split pulleys of a balanced transmission as described herein.

B. Balanced Inner Pulley Differential Shifter

A variety of shifting mechanisms may be applied to control, in common, the effective diameter of multiple inner split pulleys of a nested-pulley transmission as described herein. This can include adapting a shifting mechanism of a single-inner-split-pulley transmission to control multiple inner split pulleys. For example, the differential mechanisms illustrated in FIGS. 5 and 6 to control the axial distance between half-pulleys of a single split pulley may be adapted to control the axial distances between the half-pulleys of multiple split pulleys.

Figure 7:
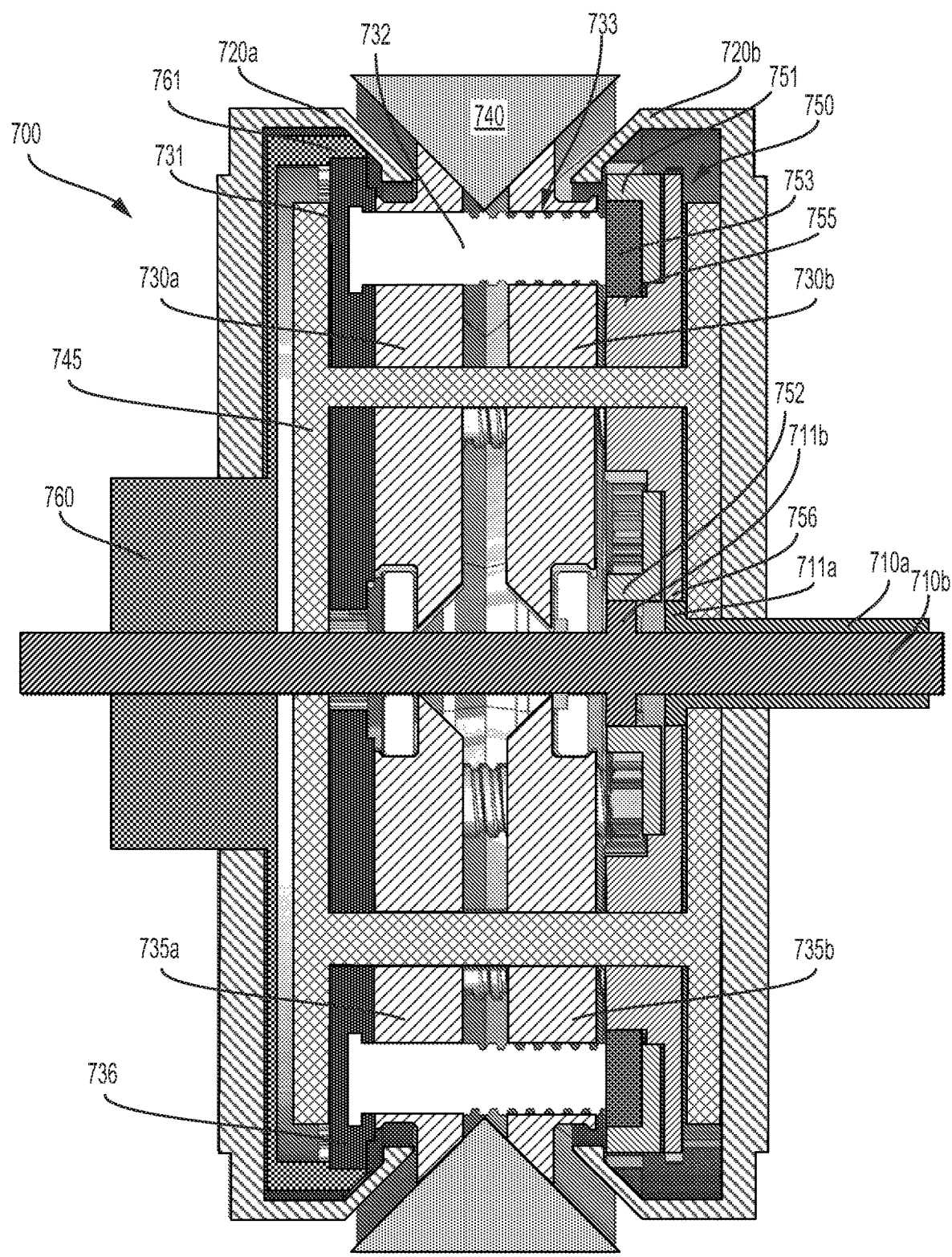
FIG. 7 is a cross-sectional view of an example shifting mechanism of a variable transmission.

As an example, FIG. 7 shows, in cross-section, a transmission 700 that includes an outer split pulley having first 720a and second 720b half-pulleys, a first inner split pulley having first 730a and second 730b half-pulleys, and a second inner split pulley having first 735a and second 735b half-pulleys. The inner split pulleys are rotatably coupled (e.g., via ball bearings) to a planet carrier 745. A belt 740 is in contact with the outer split pulley and the inner split pulleys. The first half-pulleys 730a, 730b of the first and second inner split pulleys are coupled (e.g., fused, formed from a single piece of material, etc.) to respective first 731 and second 736 planet gears that are in geared contact with a ring gear 761 that is coupled to an output member 760. First 710a and second 710b inputs are coupled to the first and second inner split pulleys via respective differentials such that the input members 710a, 710b can be driven in common to realize a torque at the output member 760 of the transmission 700. The input members 710a, 710b can be driven differentially to effect a change in the transmission ratio of the transmission 700 by adjusting the axial distances between the half-pulleys of the inner split pulleys.

A differential 750 is coupled to the first inner split pulley to facilitate this control. The differential 750 includes a sun gear 755 and a ring gear 751 that are in geared contact with a screw gear 753. The screw gear 753 is coupled (e.g., fused) to a screw 732 that is in contact with threads 733 of the second half-pulley 730b of the first inner split pulley such that rotation of the screw 732 relative to the first inner split pulley results in a change in the axial distance between the half-pulleys 730a, 730b of the first inner split pulley. Such rotation can be accomplished by relative rotation between the sun gear 755 and the ring gear 751 of the transmission 751. The sun gear 755 is coupled to a ring gear 756 that is in geared contact with a sun gear 711a that is coupled to the first input member 710a. Thusly, rotation of the first input member 710a can effect rotation of the sun gear 755. The ring gear 751 is coupled to another ring gear 752 that is in geared contact with another sun gear 711*b* that is coupled to the second input member 710*b*. Thusly, rotation of the second input member 710*b* can effect rotation of the ring gear 751. Accordingly, differential rotation/torque between the first 710*a* and second 710*b* input members may effect a change in the axial distance between/exertion of an axial force between the half-pulleys 730*a*, 730*b* of the first inner split pulley. Additionally, net torque between the first 710*a* and second 710*b* input members may result in the realization of a torque at the output member 760.

C. Balanced Inner Pulley Differential Shifter

In some examples, each inner split pulley of a transmission as described herein could be driven by first and second input members, e.g., via sun gears coupled to the first and second input members. The half-pulleys of each inner split pulley could be driven directly by the first input member while the half-pulley of each inner split pulley could be driven indirectly by a screw that engages, via threads, with at least one of the half-pulleys. Thus, a difference in rotation and/or torque between the input members could result, via the screw, in an axial force and/or change in distance between the half-pulleys of each of the inner split pulleys. Rotation and/or torque applied in common via the input members could be transmitted, via the split pulleys, through the transmission.

Figure 8:
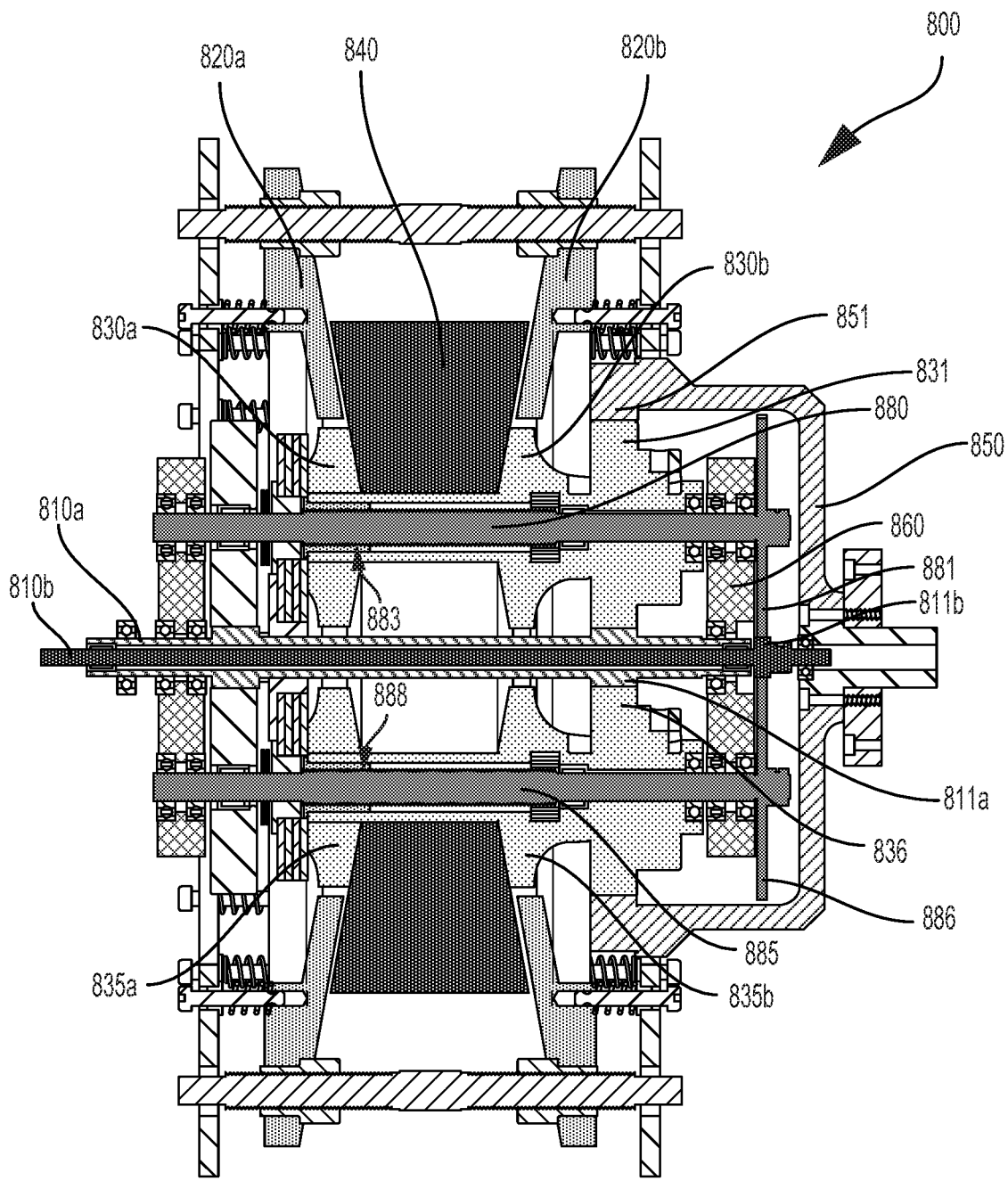
FIG. 8 is a cross-sectional view of an example variable transmission.

FIG. 8 illustrates, in cross-section, an example transmission 800. The transmission 800 includes an outer split pulley that includes a first half-pulley 820*a* and a second half-pulley 820*b*, a first inner split pulley that includes that includes a first half-pulley 830*a* and a second half-pulley 830*b*, and a second inner split pulley that includes a first half-pulley 835*a* and a second half-pulley 835*b*. The inner split pulleys are coupled to the outer split pulley via a belt 840. A first screw 880 is rotationally coupled to the second half-pulley 830*b* of the first split pulley and via threads 883 to the first half-pulley 830*a* of the first split pulley. A second screw 885 is rotationally coupled to the second half-pulley 835*b* of the second split pulley and via threads 888 to the first half-pulley 835*a* of the second split pulley. The second half-pulley 830*b* of the first split pulley is coupled to a first gear 831 and the second half-pulley 835*b* of the second split pulley is coupled to a second gear 836. The first screw 880 is coupled to a third gear 881 and the second screw 885 is coupled to a fourth gear 886.

First 810*a* and second 810*b* input members are coupled to respective first 811*a* and second 811*b* sun gears. The first sun gear 811*a* is in geared contact with the first 831 and second 836 gears and the second sun gear 811*b* is in geared contact with the third 881 and fourth 886 gears. These elements form a differential such that a torque difference between the first input member 811*a* and the second input member 811*b* causes an axial force to be applied, via the differential, between the half-pulleys of the first and second inner split pulleys, thus allowing an axial distance ("d") between the first and second half-pulleys of the inner split pulleys to increase or decrease. The first 810*a* and second 810*b* input members are coaxial and concentric, and the second input member 810*b* is disposed partially within the first input member 810*a*.

The transmission 800 also includes a ring gear 851 that is in geared contact with the first 831 and second 836 gears and that is coupled to an output member. The half-pulleys 820*a*, 820*b* of the outer split pulley are rotationally mechanically grounded such that, when a net torque is applied via the first 810*a* and second 810*b* input members, a torque is transmitted to the output member 850 via the inner split pulleys.

E. Threaded Cam Differential Shifter

In some examples, a differential could be provided that includes opposite-handed threaded portions (e.g., nuts, tapped holes, threads of a ball screw). The threaded portions could then be in contact with corresponding screws coupled to inputs of the differential. Accordingly, differential rotation of the inputs can cause axial motion/forces to be applied to a half-pulley in contact with the cam (as one screw screws into its corresponding threaded portion, the other screw unscrews from its corresponding threaded portion). In-common rotation of the inputs would result in a rotation of and/or an application of torque to the cam and/or the split pulley. The threaded portions could be rigidly coupled to each other (e.g., tapped from opposite direction into a single hole formed in the cam). Alternatively, the threaded portions could be formed in respective sub-portions (e.g., "sub-cams") of the cam, permitting relative motion between the threaded portions. Such sub-portions could be coupled via pins or other methodologies to permit relative axial motion between the sub-portions but to prevent relative rotation between the sub-portions. Such cams, screws, threaded portions, and associated elements could constitute a differential that applies differential torque between the inputs toward shifting the transmission ratio of a transmission (via axial motion of the cam) and that applies net torque toward an output torque of the transmission.

Figure 9:
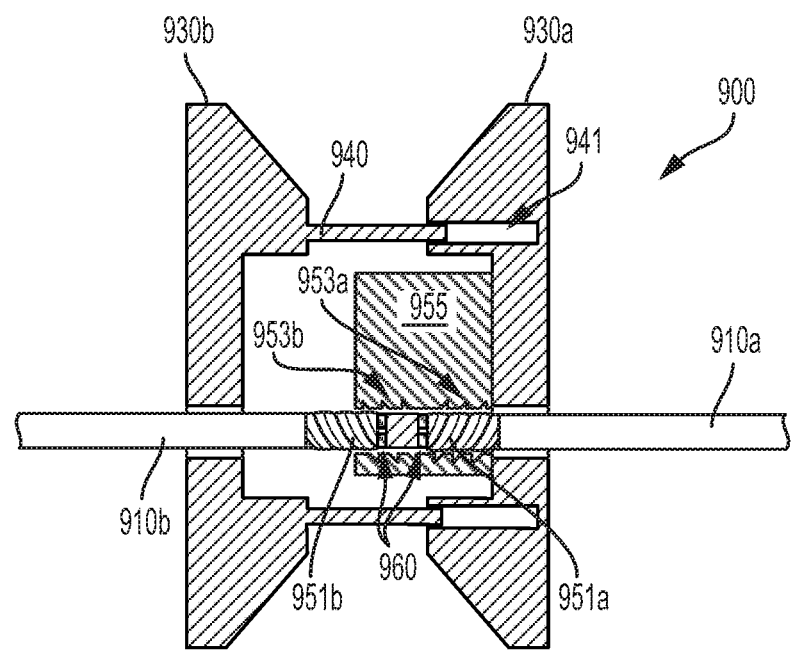
FIG. 9 is a cross-sectional view of an example shifting mechanism of a variable transmission.

FIG. 9 illustrates an example split pulley 900 (e.g., a split pulley of a variable transmission) that includes a cam 955 having first 953*a* and second 953*b* threaded portions (e.g., threads of respective ball screws). The threaded portions 953*a*, 953*b* have opposite handedness. The transmission 900 additionally includes first 930*a* and second 930*b* half-pulleys. The second half-pulley 930*b* includes pins 940 that extend into respective holes 941 of the first half-pulley 930*a*. The pins 940 allow the half-pulleys 930*a*, 930*b* to translate axially relative to each other but prevent relative rotation between the half-pulleys 930*a*, 930*b* (and thus may be employed to transmit torque from the input members 910*a*, 910*b* to the second half-pulley 930*b*). The first half-pulley 930*a* is rigidly coupled to the cam 955. Two input members 910*a*, 910*b* are coupled to respective screws 951*a*, 951*b* that are, themselves, engaged with respective threaded portions 953*a*, 953*b* of the cam 955 such that a torque difference between the first input member 910*a* and the second input member 910*b* causes an axial force to be applied between the cam 955 and the first half-pulley 930*a*. A thrust bearing 960 is provided to allow the first 951*a* and second 951*b* screws to exert axial forces on each other so as to effect the generation of the axial force between the cam 955 and the first half-pulley. Such an axial force may thus allow an axial distance ("d") between the first half-pulley 930*a* and the second half-pulley 930*b* to increase or decrease. The first 910*a* and second 910*b* input members extend outward from the half-pulleys 930*a*, 930*b* in opposite directions.

A net torque provided by the first 910*a* and second 910*b* input members may be applied to the half-pulleys 930*a*, 930*b*, e.g., to drive a belt of a variable transmission and thus to drive an output of the variable transmission. Such a net torque may be coupled from the inputs to the half-pulleys via the cam 955, via the pins 940, and/or some other element(s) of the split pulley 900.

Note that the arrangement of the cam 955, screws 951*a*, 951*b*, and half-pulleys 930*a*, 930*b* as shown in FIG. 9 is intended as a non-limiting example of a mechanism that uses such a doubly-threaded cam to effect control of the axial distance between first and second half-pulleys of a conical (or otherwise configured) split pulley. In another example, the cam could be provided as first and second sub-cams, having respective first and second opposite-handedness threaded portions. The sub-cams could be rigidly coupled to respective half-pulleys 930*a*, 930*b* and coupled to each other via pins or other methodologies to permit relative axial motion between the sub-portions (and between the half-pulleys) but to prevent relative rotation between the sub-portions.

Note that the embodiment shown in FIG. 9 is intended only as a non-limiting example. Alternative embodiments are anticipated. The example half-pulleys 930*a*, 930*b* are rigidly coupled, rotationally, to the cam 955 (and thus to net rotation of the inputs 910*a*, 910*b*); however, the half-pulleys 930*a*, 930*b* could be coupled to the inputs 910*a*, 910*b* and/or the cam 955 via respective additional cams and/or cam bearings to facilitate trochoidal motion of the half-pulleys 930*a*, 930*b* in response to net rotation of the input members 910*a*, 910*b*. Additionally or alternatively, the half-pulleys 930*a*, 930*b* could be driven by input members that rotate about an axis in common with the half-pulleys 930*a*, 930*b*. A pitch, lead, number of threads, and/or other properties of the screws 951*a*, 951*b* could be specified to control a relationship between the differential torque and the applied transmission ratio-shifting force, to asymmetrically apportion energy from each of the two inputs toward transmission ratio-shifting and/or output driving, to control a mechanical advantage in shifting and/or output driving to one or both inputs, or to provide some other benefit according to an application.

In yet another example, the differential shifting mechanisms depicted in FIG. 9 may be adapted to control, in common, the axial distance between the half-pulleys of multiple inner split pulleys of a balanced transmission as described herein (e.g., using mechanisms similar to those illustrated in FIGS. 7 and/or 8). For example, each of the first 910*a* and second 910*b* input members may be coupled to respective planet gears in respective planetary differentials whose respective sun gears, rings gears, and/or planet carriers are being driven by respective first and second overall inputs to the transmission.

IV. ADDITIONAL SHIFTING MECHANISMS

The example shifting mechanisms illustrated in FIGS. 5-9 and described above incorporate elements configured as a differential in order to provide, from a difference in torque between two inputs, a axially-directed shifting force between opposite half-pulleys of one or more conical (or otherwise configured) split pulleys. However, other, non-differential mechanisms are also anticipated to permit rapid, controllable shifting of the transmission ratio of a split pulley variable transmission. For example, a first input could be provided that is coupled to a split pulley such that torque applied via the first input is applied, via the split pulley, to an output of the transmission (e.g., via a v-belt). A second input is also provided via which torque may be exerted to effect shifting of the transmission. In such an example, the shifting of the transmission ratio could be related to a relative rotation between the two inputs, and substantially unrelated to any difference in torque between the two inputs. In such an example, the second input could rotate at the same rate as the first input, with substantially no torque applied, to maintain the transmission ratio at a particular value. In such an example, the second input could be actively driven to match the speed of the first input. Alternatively, the second input could be decoupled from whatever motor is used to drive the second input in order to maintain the transmission ratio at a particular value. In yet another embodiment, the second input could be coupled to a drive motor (e.g., to a drive motor used to drive the first input) via a clutch, such that the drive motor could operate to effect shifting of the transmission ratio when the drive motor is coupled, via the clutch, to the second input.

Figure 10:
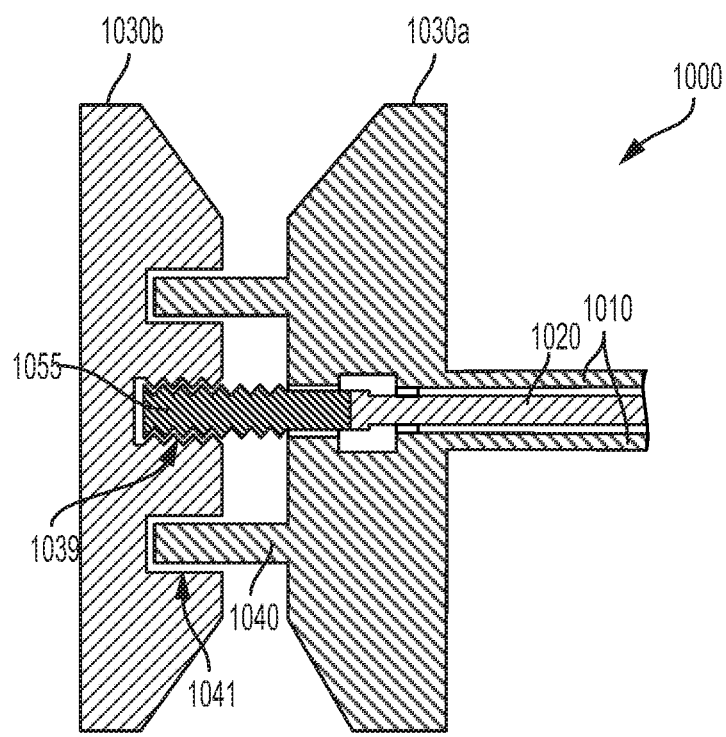
FIG. 10 is a cross-sectional view of an example shifting mechanism of a variable transmission.

FIG. 10 illustrates, in cross-section, an example of a split pulley 1000 of such a transmission. The split pulley 1000 includes two half pulleys 1030*a*, 1030*b* and two input members 1010, 1020. The first input member 1010 is coupled to at least one of the half-pulleys 1030*a*, 1030*b* such that a torque applied to the first input member 1010*a* is transmitted to the first 1030*a* and second 1030*b* half-pulleys. The first half-pulley 1030*a* includes pins 1040 that extend into respective holes 1041 of the second half-pulley 1030*b*. The pins 1040 allow the half-pulleys 1030*a*, 1030*b* to translate axially relative to each other but prevent relative rotation between the half-pulleys 1030*a*, 1030*b* (and thus may be employed to transmit torque from the first input member 1010 to the second half-pulley 1030*b*).

A second input member 1020 is coupled to a screw 1055. The first 1010 and second 1020 input members are coaxial and concentric, and the second input member 1020 is disposed partially within the first input member 1010. Accordingly, differential rotation between the first input member 1010 and the second input member 1020 can result in rotation of the screw 1055. The screw 1055 engages with a threaded portion 1039 of the second half-pulley 1030*b* such that differential rotation between the first input member 1010 and the second input member 1020 results in an axial force being applied, via the screw 1055, between the first half-pulley 1030*a* and the second half-pulley 1030*b*, thus allowing an axial distance ("d") between the first half-pulley 1030*a* and the second half-pulley 1030*b* to increase or decrease.

Note that the embodiment shown in FIG. 10 is intended only as a non-limiting example. Alternative embodiments are anticipated. For example, a different mechanism (e.g., a rack, a linear gear, a threaded coupling between the half-pulleys) could be used to translate differential rotation between the first 1010 and second 1020 input members into an axial motion between the half-pulleys 1030*a*, 1030*b*. Multiple screws could be included, each driven by the second input (e.g., via one or more gears) to translate rotation of the second input 1020 into an axial force/motion between the half-pulleys. The example half-pulleys 1030*a*, 1030*b* are rigidly coupled, rotationally, to rotation of the first input member 1010; however, the half-pulleys 1030*a*, 1030*b* could be coupled to the first input 1010 via respective cams and cam bearings to facilitate trochoidal motion of the half-pulleys 1030*a*, 1030*b* in response to rotation of the first input member 1010. In yet another example, the input members for the illustrated split pulley 1000 could be coupled, via a planetary gearset or via some other mechanism, to input members used to drive multiple such split pulleys arranged, e.g., in a balanced arrangement as described elsewhere herein in order to adjust the axial distances of each of the multiple split pulleys in common.

Figure 11:
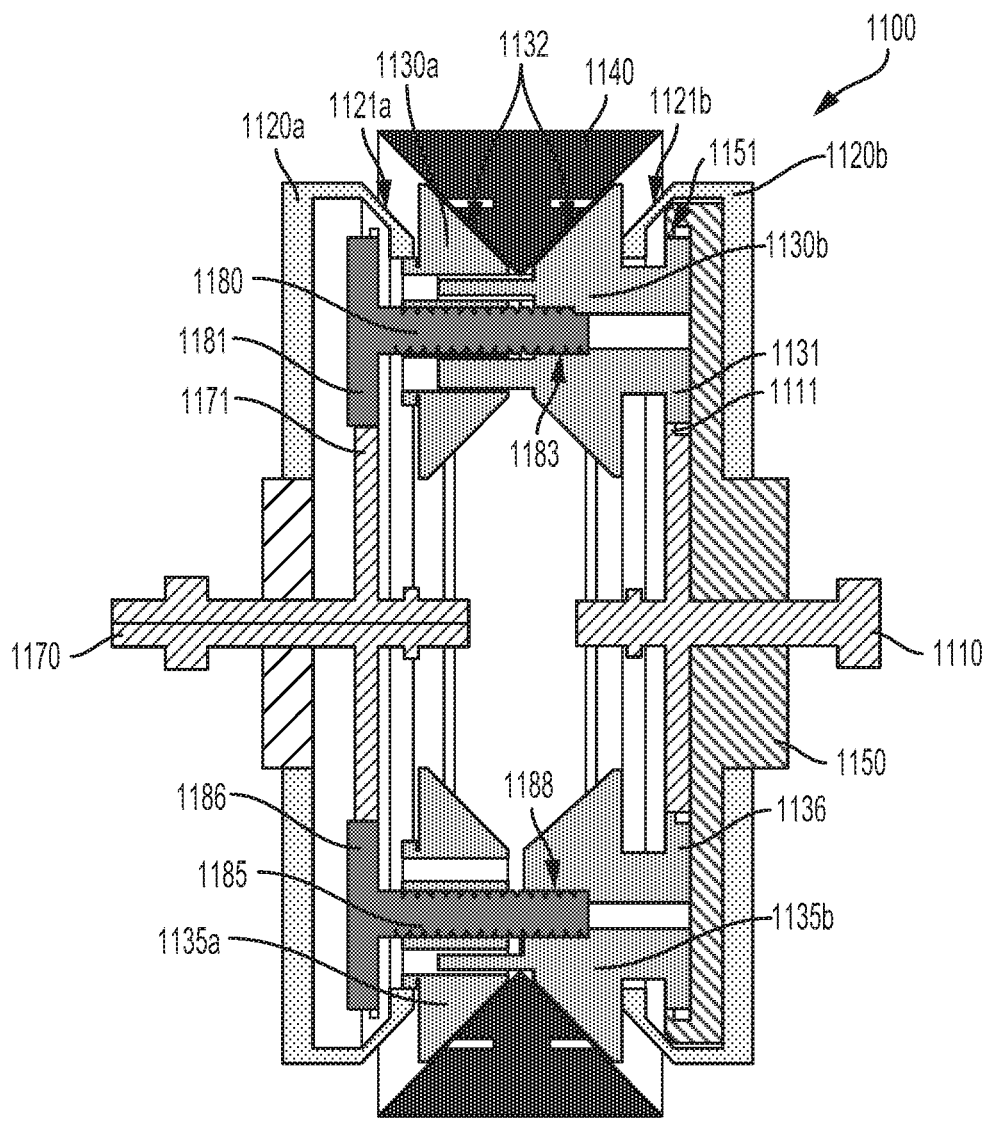
FIG. 11 is a cross-sectional view of an example shifting mechanism of a variable transmission.

In yet another example, the shifting mechanisms depicted in FIG. 10 may be adapted to control, in common, the axial distance between the half-pulleys of multiple inner split pulleys of a balanced transmission as described herein. FIG. 11 illustrates, in cross-section, such a transmission 1100. The transmission 1100 includes first 1120a and second 1120b half-pulleys of an outer split pulley that have respective bearing surfaces 1121a, 1121b via which the outer split pulley contacts a belt 1140. The transmission 1100 also includes two inner split pulleys. The first inner split pulley includes first 1130a and second 1130b half-pulleys that have respective bearing surfaces 1132 via which the first inner split pulley contacts the belt 1140. The second inner split pulley includes first 1135a and second 1135b half-pulleys. The half-pulleys of each inner split pulley are rotationally locked to each other (e.g., via matching pins and depressions) such a driving torque applied to one of the half-pulleys of a particular inner split pulley (e.g., via a planet gear fused to the half-pulley) is also applied to the other half-pulley of the particular inner split pulley. The first and second inner split pulleys are coupled to respective first 1131 and second 1136 planet gears that are in geared contact with a central sun gear 1111 and an outer ring gear 1151 that is coaxial with the sun gear. The first and second inner split pulleys are maintained in an opposite, balanced arrangement within the transmission 1100 by a planet carrier (not shown) or via some other means (e.g., via forces applied by the sun 1111 and ring 1151 gears).

The transmission 1100 has a first input member 1110 that is coupled to the sun gear and an output member 1150 that is coupled to the ring gear 1151. The half-pulleys 1120a, 1120b of the outer split pulley are mechanically grounded to prevent rotation. Accordingly, rotations and/or torques may be transmitted between the first input member 1110 and the output member 1150 via the inner split pulleys according to a transmission ratio that is controllable by adjusting the axial distances between the half-pulleys of the outer split pulley and the inner split pulleys. Note that this configuration is intended as a non-limiting example embodiment; the transmission 1100 could, alternatively, have inputs and outputs coupled to the sun gear 1111, ring gear 1151, a planet carrier (not shown), and/or the outer split pulley 1120a, 1120b with appropriate alternative elements of the transmission 1100 rotationally grounded. For example, the ring gear 1151 could be grounded and the outer split pulley 1120a, 1120b could be allowed to rotate. In such an example, an output member could be coupled to the outer split pulley 1120a, 1120b and rotations and/or torques could be transmitted from the input member 1110 to the output member that is coupled to the outer split pulley 1120a, 1120b via the transmission 1100.

The transmission ratio of the transmission 1100 is controllable by adjusting the axial distances between the half-pulleys of the outer split pulley and the inner split pulleys. Adjustment of the axial distances between the half-pulleys of the inner split pulleys can be accomplished by applying a differential rotation to a second input member 1170 relative to the rotation of the first input member 1110. The first half-pulley 1130a of the first inner split pulley is coupled to a first screw 1180 that is in contact with a threaded portion 1183 of the second half-pulley 1130b of the first inner split pulley such that rotation of the first screw 1180 relative to the threaded portion 1183 of the second half-pulley 1130b results in at least one of a force or a change in the axial distance between the half-pulleys 1130a, 1130b of the first inner split pulley. Similarly, the first half-pulley 1135a of the second inner split pulley is coupled to a second screw 1185 that is in contact with a threaded portion 1188 of the second half-pulley 1135b of the second inner split pulley such that rotation of the second screw 1185 relative to the threaded portion 1188 of the second half-pulley 1135b results in at least one of a force or a change in the axial distance between the half-pulleys 1135a, 1135b of the second inner split pulley.

The first 1180 and second 1185 screws are coupled to respective first 1181 and second 1186 gears that are in geared contact with a sun gear 1171 that is coupled to the second input member 1170. Accordingly, relative rotation between the first input member 1110 and the second input member 1170 results in rotation of the screws 1180, 1185 relative to the respective inner split pulleys. Thus, this relative rotation allows the axial distance between the half-pulleys of the inner split pulleys to be controlled, thereby allowing the transmission ratio of the transmission 1100 to be controlled. The axial distance between the half-pulleys 1120a, 1120b of the outer split pulley can be controlled by another active mechanism (not shown). Additionally or alternatively, the axial distance between the half-pulleys 1120a, 1120b of the outer split pulley can be passively controlled by a spring or other elastic element coupled between the half-pulleys 1120a, 1120b of the outer split pulley.

Note that the embodiment shown in FIG. 11 is intended only as a non-limiting example. Alternative embodiments are anticipated. For example, a different mechanism (e.g., a rack, a linear gear, a threaded coupling between the half-pulleys) could be used to translate differential rotation between the first 1110 and second 1170 input members into an axial motion between the half-pulleys of the first and second split pulleys. The example half-pulleys of each inner split pulley may be coupled, rotationally, to rotation of their respective planet gears 1131, 1136. In some examples, the second input member 1170 could interface with the screw gears 1181, 1186 via a ring gear.

Figure 12:
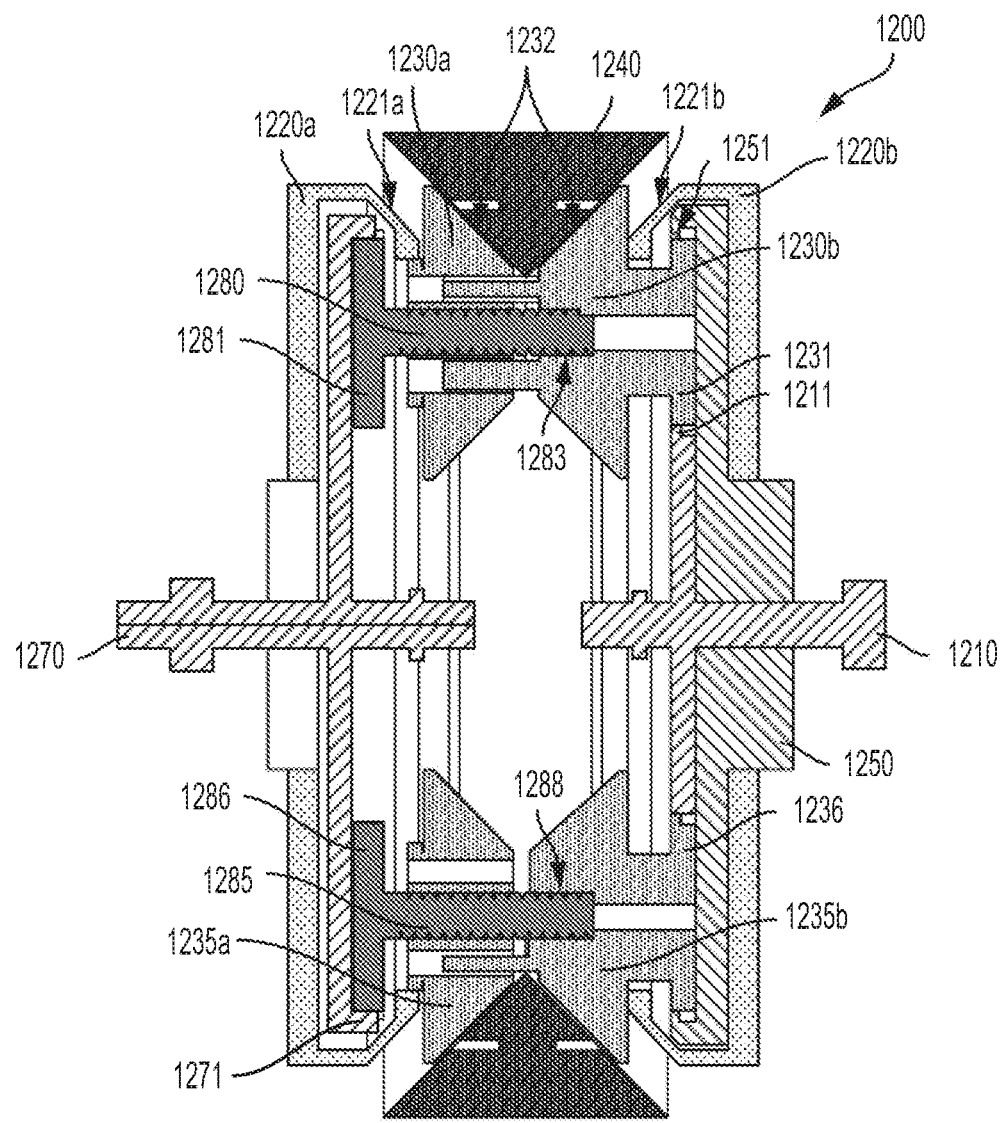
FIG. 12 is a cross-sectional view of an example shifting mechanism of a variable transmission.

An example of such a transmission 1200 is illustrated in FIG. 12. The transmission 1200 includes first 1220a and second 1220b half-pulleys of an outer split pulley that have respective bearing surfaces 1221a, 1221b via which the outer split pulley contacts a belt 1240. The transmission 1200 also includes two inner split pulleys. The first inner split pulley includes first 1230a and second 1230b half-pulleys that have respective bearing surfaces 1232 via which the first inner split pulley contacts the belt 1240. The second inner split pulley includes first 1235a and second 1235b half-pulleys. The half-pulleys of each inner split pulley are rotationally locked to each other (e.g., via matching pins and depressions) such a driving torque applied to one of the half-pulleys of a particular inner split pulley (e.g., via a planet gear fused to the half-pulley) is also applied to the other half-pulley of the particular inner split pulley. The first and second inner split pulleys are coupled to respective first 1231 and second 1236 planet gears that are in geared contact with a central sun gear 1211 and an outer ring gear 1251 that is coaxial with the sun gear. The first and second inner split pulleys are maintained in an opposite, balanced arrangement within the transmission 1200 by a planet carrier (not shown) or via some other means (e.g., via forces applied by the sun 1211 and ring 1251 gears).

The transmission 1200 has a first input member 1210 that is coupled to the sun gear and an output member 1250 that is coupled to the ring gear 1251. The half-pulleys 1220a, 1220b of the outer split pulley are mechanically grounded to prevent rotation. Accordingly, rotations and/or torques may be transmitted between the first input member 1210 and the output member 1250 via the inner split pulleys according to a transmission ratio that is controllable by adjusting the axial distances between the half-pulleys of the outer split pulley and the inner split pulleys.

The transmission ratio of the transmission 1200 is controllable by adjusting the axial distances between the half-pulleys of the outer split pulley and the inner split pulleys. Adjustment of the axial distances between the half-pulleys of the inner split pulleys can be accomplished by applying a differential rotation to a second input member 1270 relative to the rotation of the first input member 1210. The first half-pulley 1230a of the first inner split pulley is coupled to a first screw 1280 that is in contact with a threaded portion 1283 of the second half-pulley 1230b of the first inner split pulley such that rotation of the first screw 1280 relative to the threaded portion 1283 of the second half-pulley 1230b results in at least one of a force or a change in the axial distance between the half-pulleys 1230a, 1230b of the first inner split pulley. Similarly, the first half-pulley 1235a of the second inner split pulley is coupled to a second screw 1285 that is in contact with a threaded portion 1288 of the second half-pulley 1235b of the second inner split pulley such that rotation of the second screw 1285 relative to the threaded portion 1288 of the second half-pulley 1235b results in at least one of a force or a change in the axial distance between the half-pulleys 1235a, 1235b of the second inner split pulley.

The first 1280 and second 1285 screws are coupled to respective first 1281 and second 1286 gears that are in geared contact with a ring gear 1271 that is coupled to the second input member 1270. Accordingly, rotation of the second input member 1270 can result in rotation of the screws 1280, 1285 relative to the respective inner split pulleys. Thus, controlling the rotation of the second input member 1270 can allow the axial distance between the half-pulleys of the inner split pulleys to be controlled, thereby allowing the transmission ratio of the transmission 1200 to be controlled. Driving the screws 1280, 1285 using a ring gear instead of a sun gear (e.g., as in the transmission 1100 of FIG. 11) can allow the rotational speed and/or torque necessary to shift the transmission ratio of the transmission 1200 to be tailored to an application. In particular, use of a ring gear can reduce the speed of rotation of the second input 1270 relative to the speed of rotation of the first input 1210 necessary to maintain a particular transmission ratio (i.e., the speed of the second input required not to shift the transmission ratio of the transmission 1200).

The axial distance between the half-pulleys 1220a, 1220b of the outer split pulley can be controlled by another active mechanism (not shown). Additionally or alternatively, the axial distance between the half-pulleys 1220a, 1220b of the outer split pulley can be passively controlled by a spring or other elastic element coupled between the half-pulleys 1220a, 1220b of the outer split pulley.

V. CONCLUSION

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

In particular, note that embodiments herein may be driven by inputs which extend outward from a split pulley (or other driven element(s)) in opposite directions or by inputs which extend in the same direction (e.g., inputs which are coaxial and which are nested within one another). Additionally, the embodiments illustrated herein which provide for the control of an axial separation between half-pulleys of a split pulley may receive inputs that are coaxial with a rotational and/or geometrical axis of the split pulley (e.g., that are coaxial with an axis of rotation of a conical bearing surface of the half-pulley(s)). Alternatively, such embodiments may receive inputs that are not coaxial with a rotational and/or geometrical axis of the split pulley (e.g., the input(s) may drive the split pulley via one or more cams, via sun, ring, or other varieties of gearing, via belts, or via some other means, to enable driving the split pulley according to a nested transmission configuration or to facilitate some other application).

What is claimed is:

1. A transmission having a reduced volume and a controllable transmission ratio to achieve at least one of reduced size, reduced weight, reduced cost or increased efficiency, the transmission comprising:
   an outer conical split pulley having a first half-pulley and a second half-pulley;
   two or more inner conical split pulleys nested within the outer conical split pulley, each inner conical split pulley having a respective first half-pulley and second half-pulley;
   a belt, wherein the belt is in contact with the outer conical split pulley and with at least one of the inner conical split-pulleys;
   a first input member; and
   a first output member coupled to the first input member via at least one of the two or more inner conical split pulleys such that torque can be transmitted between the first input member and the first output member.

2. The transmission of claim 1, wherein each inner conical split pulley has a respective axis of rotation, and wherein the inner conical split pulleys are disposed within the transmission such that the axes of rotation of the inner conical split pulleys are disposed regularly around a central axis of rotation of the transmission and at a specified distance from the central axis of rotation.

3. The transmission of claim 2, further comprising:
   two or more planet gears, wherein each planet gear of the two or more planet gears is coupled to a respective inner split pulley of the two or more inner split pulleys; and
   a sun gear that rotates about the central axis of rotation, wherein the sun gear is coupled to the two or more planet gears such that a torque at the sun gear causes a torque to be realized at the first output member.

4. The transmission of claim 3, further comprising:
   a ring gear coupled to the two or more planet gears and coaxial with the sun gear, wherein the ring gear is coupled to the first output member.

5. The transmission of claim 3, further comprising:
   a planet carrier rotatably coupled to each of the inner conical split pulleys such that the planet carrier rotates around the central axis of rotation, wherein the planet carrier is coupled to the first output member.

6. The transmission of claim 2, further comprising:
two or more planet gears, wherein each planet gear of the two or more planet gears is coupled to a respective inner split pulley of the two or more inner split pulleys;
a planet carrier that rotates about the central axis of rotation, wherein the planet carrier is rotatably coupled to each of the inner split pulleys, wherein the planet carrier is coupled to the first input member; and
a ring gear that is coupled to the two or more planet gears and that rotates around the central axis of rotation, wherein the ring gear is coupled to the first output member, and wherein a torque at the planet carrier causes a torque to be realized at the first output member.

7. The transmission of claim 1, wherein the outer conical split pulley is coupled to a mechanical ground such that the first and second half-pulleys of the outer conical split pulley are prevented from rotating.

8. The transmission of claim 1, wherein the first half-pulley and the second half-pulley of the outer conical split pulley are coupled to each other via an elastic element such that an axial force is exerted between the first half-pulley and the second half-pulley of the outer conical split pulley by the elastic element.

9. The transmission of claim 1, further comprising:
a second input member; and
a differential, wherein the differential is coupled to the first and second input members and to at least one of the inner conical split pulleys such that a torque difference between the first input member and the second input member causes a force to be applied, via the differential, between the first half-pulley of a given one of the inner conical split pulleys and the second half-pulley of the given one of the inner conical split pulleys, thus allowing an axial distance between the first half-pulley of the given one of the inner conical split pulleys and the second half-pulley of the given one of the inner conical split pulleys to increase or decrease, which thereby enables a change in an effective diameter of each of the inner conical split pulleys resulting in the controllable transmission ratio of the transmission.

10. The transmission of claim 9, wherein the differential is coupled to the first and second input members and to at least one of the inner conical split pulleys such that a net torque of the first input member and the second input member causes a torque to be realized at the first output member.

11. The transmission of claim 9, wherein the first input member and the second input member are coaxial and concentric and wherein the first input member is disposed at least partially within the second input member.

12. The transmission of claim 9, further comprising a screw, wherein the screw is coupled to the first half-pulley of a particular one of the two or more inner split pulleys via a threaded hole, and wherein the differential comprises:
a sun gear, wherein the sun gear is coupled to the first input member such that rotation of the first input member results in rotation of the sun gear;
a ring gear, wherein the ring gear is coaxial with the sun gear, and wherein the ring gear is coupled to the second input member such that rotation of the second input member results in rotation of the ring gear;
a planet gear that is coupled to the screw, wherein the planet gear engages with the sun gear and with the ring gear such that a rotation difference between the first input member and the second input member results in rotation of the planet gear and the screw relative to the particular inner split pulley, which thereby enables a change in the axial distance between the first half-pulley of the particular inner split pulley and the second half-pulley of the particular inner split pulley via application of force from the screw onto the first half-pulley of the particular inner split pulley via the threads of the threaded hole.

13. The transmission of claim 1, further comprising:
a second input member;
a screw, wherein the screw is coupled to the first half-pulley of a particular one of the two or more inner split pulleys via a threaded hole such that relative rotation between the screw and the first half-pulley of the particular one of the two or more inner split pulleys causes an axial distance between the first half-pulley of the particular one of the two or more inner split pulleys and the second half-pulley of the particular one of the two or more inner split pulleys to increase or decrease, which thereby enables a change in an effective diameter of the particular one of the two or more inner split pulleys resulting in the controllable transmission ratio of the transmission;
a screw gear that is coupled to the screw; and
an additional sun gear that is coupled to the second input member, wherein the additional sun gear engages with the screw gear.

14. The transmission of claim 1, further comprising:
a second input member;
a screw, wherein the screw is coupled to the first half-pulley of a particular one of the two or more inner split pulleys via a threaded hole such that relative rotation between the screw and the first half-pulley of the particular one of the two or more inner split pulleys causes an axial distance between the first half-pulley of the particular one of the two or more inner split pulleys and the second half-pulley of the particular one of the two or more inner split pulleys to increase or decrease, which thereby enables a change in an effective diameter of the particular one of the two or more inner split pulleys resulting in the controllable transmission ratio of the transmission;
a screw gear that is coupled to the screw; and
an additional ring gear that is coupled to the second input member, wherein the additional ring gear engages with the screw gear.

15. The transmission of claim 1, wherein each inner conical split pulley has a respective axis of rotation, wherein the outer conical split pulley has an outer circumference, and wherein at least one of the inner conical split pulleys is disposed within the transmission such that the axis of rotation of the at least one inner conical split pulley is located within the outer circumference of the outer conical split pulley.

16. A transmission having a reduced volume and a controllable transmission ratio to achieve at least one of reduced size, reduced weight, reduced cost or increased efficiency, the transmission comprising:
an outer conical split pulley having a first half-pulley and a second half-pulley, wherein the wherein the outer conical split pulley is coupled to a mechanical ground such that the first and second half-pulleys of the outer conical split pulley are prevented from rotating;

two or more inner conical split pulleys nested within the outer conical split pulley, each inner conical split pulley having a respective first half-pulley and second half-pulley;

two or more planet gears, wherein each planet gear of the two or more planet gears is coupled to a respective inner split pulley of the two or more inner split pulleys;

a belt, wherein the belt is in contact with the outer conical split pulley and with at least one of the inner conical split-pulleys;

a first input member;

a first output member;

a sun gear coupled to the first input member; and a ring gear coaxial with the sun gear and coupled to the first output member, wherein the ring gear is coupled to the two or more planet gears and the sun gear is coupled to the two or more planet gears such that a torque at the sun gear causes a torque to be realized at the first output member.

17. The transmission of claim 16, wherein the first half-pulley and the second half-pulley of the outer conical split pulley are coupled to each other via an elastic element such that an axial force is exerted between the first half-pulley and the second half-pulley of the outer conical split pulley by the elastic element.

18. The transmission of claim 16, further comprising:

a second input member; and a differential, wherein the differential is coupled to the first and second input members and to at least one of the inner conical split pulleys such that a torque difference between the first input member and the second input member causes an axial force to be applied, via the differential, between the first half-pulley of a given one of the inner conical split pulleys and the second half-pulley of the given one of the inner conical split pulleys, thus allowing an axial distance between the first half-pulley of the given one of the inner conical split pulleys and the second half-pulley of the given one of the inner conical split pulleys to increase or decrease, which thereby enables a change in an effective diameter of each of the inner conical split pulleys resulting in the controllable transmission ratio of the transmission.

19. The transmission of claim 18, further comprising a screw, wherein the screw is coupled to the first half-pulley of a particular one of the two or more inner split pulleys via a threaded hole, and wherein the differential comprises:

a sun gear, wherein the sun gear is coupled to the first input member such that rotation of the first input member results in rotation of the sun gear;

a ring gear, wherein the ring gear is coaxial with the sun gear, and wherein the ring gear is coupled to the second input member such that rotation of the second input member results in rotation of the ring gear;

a planet gear that is coupled to the screw, wherein the planet gear engages with the sun gear and with the ring gear such that a rotation difference between the first input member and the second input member results in rotation of the planet gear and the screw relative to the particular inner split pulley, which thereby enables a change in the axial distance between the first half-pulley of the particular inner split pulley and the second half-pulley of the particular inner split pulley via application of force from the screw onto the first half-pulley of the particular inner split pulley via the threads of the threaded hole.

20. The transmission of claim 16, further comprising:

a second input member;

a screw, wherein the screw is coupled to the first half-pulley of a particular one of the two or more inner split pulleys via a threaded hole such that relative rotation between the screw and the first half-pulley of the particular one of the two or more inner split pulleys causes an axial distance between the first half-pulley of the particular one of the two or more inner split pulleys and the second half-pulley of the particular one of the two or more inner split pulleys to increase or decrease, which thereby enables a change in an effective diameter of the particular one of the two or more inner split pulleys resulting in the controllable transmission ratio of the transmission;

a screw gear that is coupled to the screw; and an additional sun gear that is coupled to the second input member, wherein the additional sun gear engages with the screw gear.

21. The transmission of claim 16, further comprising:

a second input member;

a screw, wherein the screw is coupled to the first half-pulley of a particular one of the two or more inner split pulleys via a threaded hole such that relative rotation between the screw and the first half-pulley of the particular one of the two or more inner split pulleys causes an axial distance between the first half-pulley of the particular one of the two or more inner split pulleys and the second half-pulley of the particular one of the two or more inner split pulleys to increase or decrease, which thereby enables a change in an effective diameter of the particular one of the two or more inner split pulleys resulting in the controllable transmission ratio of the transmission;

a screw gear that is coupled to the screw; and an additional ring gear that is coupled to the second input member, wherein the additional ring gear engages with the screw gear.

* * * * *